(12) United States Patent  (10) Patent No.: US 7,101,075 B2
Silbernagel  (45) Date of Patent: Sep. 5, 2006

(54) METHOD OF CHANGING THE WEIGHT DISTRIBUTION LOADING ON A FRONT DISCHARGE TRANSIT MIXER

(76) Inventor: Fred J. Silbernagel, 2325 NW. 56th Ter., Okalhoma City, OK (US) 73312

( * ) Notice: Subject to any disclaimer, the term of this patent is extended or adjusted under 35 U.S.C. 154(b) by 0 days.

(21) Appl. No.: 11/139,399

(22) Filed: May 27, 2005

(65) Prior Publication Data

US 2005/0213422 A1 Sep. 29, 2005

Related U.S. Application Data

(60) Continuation of application No. 10/941,287, filed on Sep. 15, 2004, now abandoned, which is a continuation of application No. 10/369,140, filed on Feb. 18, 2003, now abandoned, which is a continuation of application No. 10/056,223, filed on Jan. 24, 2002, now abandoned, which is a continuation of application No. 09/670,156, filed on Sep. 26, 2000, now abandoned, which is a continuation of application No. 09/191,885, filed on Nov. 13, 1998, now Pat. No. 6,152,457, which is a division of application No. 08/725,108, filed on Oct. 2, 1996, now Pat. No. 5,884,998.

(51) Int. Cl.
B28C 5/42 (2006.01)

(52) U.S. Cl. .................................................. 366/62
(58) Field of Classification Search ............... 366/1–2, 366/53–63, 348
See application file for complete search history.

(56) References Cited

U.S. PATENT DOCUMENTS

| 899,414 | A | 9/1908 | Koehring |
|---|---|---|---|
| 1,232,605 | A | 7/1917 | Raddatz |
| 1,358,670 | A | 11/1920 | Alborn |
| 1,415,410 | A | 5/1922 | Shafer, Jr. |
| 1,648,875 | A | 11/1927 | Griese |
| 2,031,862 | A | 2/1936 | Smith et al. |
| 2,395,571 | A | 2/1946 | McMillan |
| 2,737,254 | A | 3/1956 | Bayley |
| 2,859,949 | A | 11/1958 | Willard |
| 2,957,593 | A | 2/1960 | Evans |
| 3,038,704 | A | 6/1962 | Cook |
| 3,019,002 | A | 11/1962 | Prichard |
| 3,081,982 | A | 3/1963 | Broberg |
| 3,112,100 | A | 11/1963 | Prichard |
| 3,168,295 | A | 2/1965 | Dorrell et al. |
| 3,240,477 | A | 3/1966 | Brennan et al. |

(Continued)

FOREIGN PATENT DOCUMENTS

CA 1066267 11/1979

(Continued)

OTHER PUBLICATIONS

"The Chuting Star is Back . . . From the Future!", Magna Truck Company, P.O. Box 396, Mulberry, Florida 33860-0396.

Primary Examiner—Charles E. Cooley
(74) Attorney, Agent, or Firm—Woodard, Emhardt, Moriarty, McNett & Henry LLP

(57) ABSTRACT

The present invention is a front discharge transit mixer apparatus. In one form of the present invention the operator has an environment surrounde by a large viewing area so as to increase his ability to control the vehicle. Further, creature comforts include increased head room in the cab, air conditing, heat, and storage compartments. A total weight system is provided for assisting in maintaining the proper weight distribution of the apparatus for passage over roads and bridges.

4 Claims, 18 Drawing Sheets

U.S. PATENT DOCUMENTS

| | | |
|---|---|---|
| 3,246,884 A | 4/1966 | Prichard et al. |
| 3,334,872 A | 8/1967 | Hansen et al. |
| 3,390,895 A | 7/1968 | Verdi |
| 3,456,769 A | 7/1969 | Prichard et al. |
| 3,460,812 A | 8/1969 | Kaufman |
| 3,499,662 A | 3/1970 | Paul |
| 3,578,355 A | 5/1971 | Oeder |
| 3,603,565 A | 9/1971 | Johnson |
| 3,627,281 A | 12/1971 | Peterson |
| 3,633,879 A | 1/1972 | Prichard |
| 3,730,548 A | 5/1973 | Thaxton |
| 3,730,549 A | 5/1973 | Turner, Jr. |
| 3,730,550 A | 5/1973 | Thaxton |
| 3,756,572 A | 9/1973 | Buelow et al. |
| 3,773,304 A | 11/1973 | Hodgson |
| 3,776,358 A | 12/1973 | Williams |
| 3,784,221 A | 1/1974 | Frasier, Sr. |
| 3,825,232 A | 7/1974 | Pecorari |
| 3,929,321 A | 12/1975 | Sims |
| 3,930,567 A | 1/1976 | Sims |
| 3,969,035 A | 7/1976 | Silbernagel |
| 3,976,284 A | 8/1976 | Hupp |
| 4,009,868 A | 3/1977 | Blind |
| 4,047,604 A | 9/1977 | Daoust et al. |
| 4,090,579 A | 5/1978 | Stedman |
| D249,665 S | 9/1978 | Silbernagel |
| 4,154,534 A | 5/1979 | Lawrence et al. |
| 4,212,542 A | 7/1980 | Beekenkamp |
| 4,290,733 A | 9/1981 | Lahman |
| 4,311,396 A | 1/1982 | Brandi |
| 4,314,709 A | 2/1982 | Silbernagel |
| 4,318,621 A | 3/1982 | Lawrence et al. |
| D271,875 S | 12/1983 | Silbernagel |
| 4,428,677 A | 1/1984 | Schreiter, Jr. |
| 4,461,577 A | 7/1984 | Mecham |
| 4,527,444 A | 7/1985 | McKee et al. |
| 4,575,254 A | 3/1986 | Johnston |
| 4,619,467 A | 10/1986 | Lafferty |
| 4,619,578 A | 10/1986 | Routledge |
| 4,624,576 A | 11/1986 | Dillman |
| D291,547 S | 8/1987 | Silbernagel |
| 4,690,432 A | 9/1987 | Sakamoto et al. |
| 4,711,334 A | 12/1987 | Barry et al. |
| 4,714,269 A | 12/1987 | Raidel |
| 4,726,598 A | 2/1988 | Walters |
| 4,733,745 A | 3/1988 | Lumpkins |
| 4,733,876 A | 3/1988 | Heider et al. |
| 4,763,953 A | 8/1988 | Chalin |
| 4,789,038 A | 12/1988 | Nguyen et al. |
| 5,025,827 A | 6/1991 | Weng |
| 5,044,819 A | 9/1991 | Kilheffer et al. |
| 5,046,449 A | 9/1991 | Nelson |
| 5,046,752 A | 9/1991 | Stephens et al. |
| 5,113,350 A | 5/1992 | Sargent |
| 5,133,575 A | 7/1992 | Zantinge et al. |
| 5,149,126 A | 9/1992 | Brennan |
| 5,192,178 A | 3/1993 | Silbernagel |
| 5,193,063 A | 3/1993 | Assh |
| D346,388 S | 4/1994 | Silbernagel |
| 5,346,247 A | 9/1994 | Snyder |
| 5,348,387 A | 9/1994 | Gordon et al. |
| 5,492,402 A | 2/1996 | Alton |
| 5,820,258 A | 10/1998 | Braun |
| 5,884,998 A * | 3/1999 | Silbernagel ................. 366/62 |
| 5,954,429 A * | 9/1999 | Silbernagel ................. 366/62 |
| 6,062,716 A * | 5/2000 | Georgoulis ................. 366/54 |
| 6,149,290 A * | 11/2000 | Quigley ................. 366/54 |
| 2005/0213422 A1* | 9/2005 | Silbernagel ................. 366/53 |

FOREIGN PATENT DOCUMENTS

| | | |
|---|---|---|
| DE | 2311323 | 9/1973 |
| JP | 5-147444 | 6/1993 |
| WO | WO 92/15437 | 9/1992 |

* cited by examiner

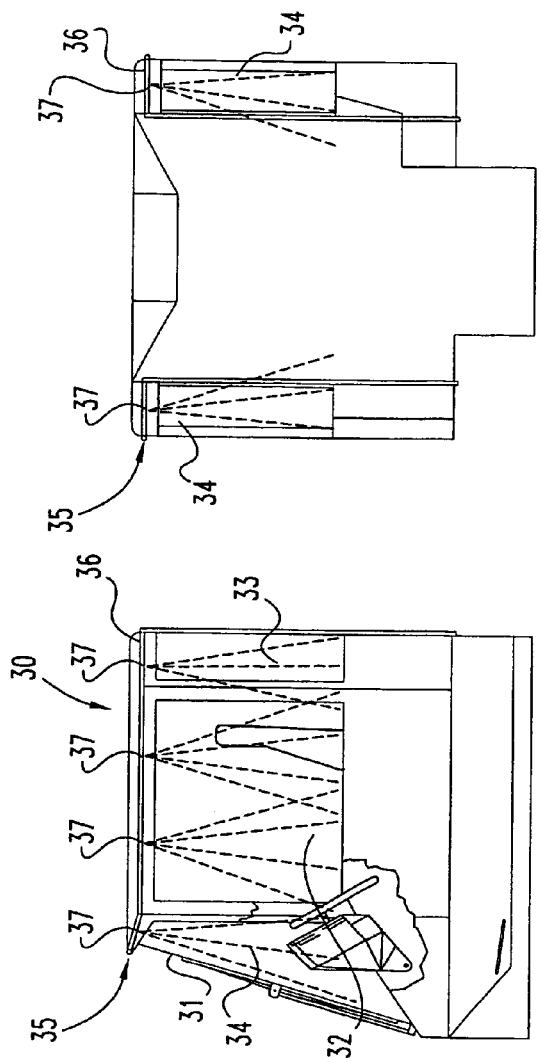
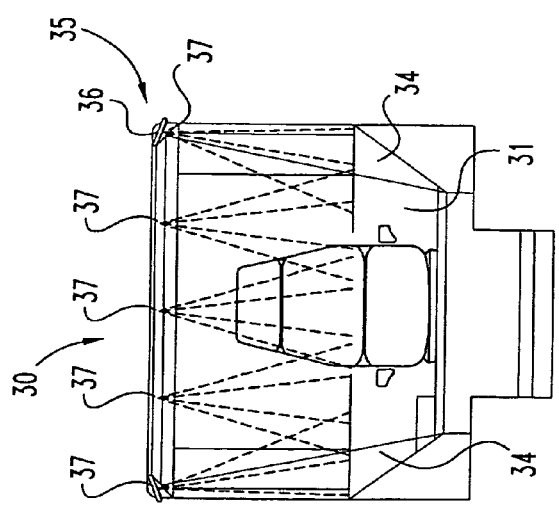

METHOD OF CHANGING THE WEIGHT DISTRIBUTION LOADING ON A FRONT DISCHARGE TRANSIT MIXER

The present application is a continuation application of U.S. patent application Ser. No. 10/941,287 filed Sep. 15, 2004, abandoned. Application Ser. No. 10/941,287 is a continuation application of U.S. patent application Ser. No. 10/369,140 filed Feb. 18, 2003, abandoned. Application Ser. No. 10/369,140 is a continuation application of U.S. patent application Ser. No. 10/056,223 filed Jan. 24, 2002, abandoned. U.S. patent application Ser. No. 10/056,223 is a continuation of U.S. patent application Ser. No. 09/670,156, filed Sep. 26, 2000, abandoned. U.S. patent application Ser. No. 09/670,156 is a continuation application of Ser. No. 09/191,885 filed on Nov. 13, 1998 and issued as U.S. Pat. No. 6,152,457 on Nov. 28, 2000. U.S. patent application Ser. No. 09/191,885 is a Divisional Application of U.S. patent application Ser. No. 08/725,108 filed on Oct. 2, 1996 and issued as U.S. Pat. No. 5,884,998 on Mar. 23, 1999. Each of the above applications and patents are incorporated herein by reference.

BACKGROUND OF THE INVENTION

The present invention relates generally to transit mixers. More particularly, in one embodiment of the present invention, the transit mixer is of a front discharge type for mixing and transporting concrete to a job site.

Transit mixers are well known in the construction industry and generally consist of a mixing drum mounted on a vehicle for the mixing and delivery of a batch of concrete. Raw materials, such as cement, aggregate, and sand are loaded into the mixing drum at a batching plant. During the transportation of the materials to the job site, the mixing of the raw materials and/or concrete is continued until the product is discharged at the job location for finishing.

For many years, transit mixers were designed and constructed so that the loading and discharge was done from the rear of the transit mixer. Therefore, it was often necessary to back the large fully loaded vehicles into the job site in order to discharge a load of concrete to the proper place. Further, at many construction sites it was necessary to have an additional worker available to assist the driver in backing up the vehicle, and to prevent other parties at the job site from crossing the path of the vehicle as it was driven backwards. Rear discharge transit mixer designs have many inherent limitations that have a detrimental effect on the concrete producers.

In response to the needs of the growing construction industry, a front discharge transit mixer was developed. The front discharge transit mixer has overcome many of the limitations associated with rear discharge transit mixers. For example, in a rear discharge mixer, the vehicle must generally be backed into the discharge position at the job site; the job site often is in a restricted drive area and the ability to place the rear discharge mixer proximate pouring location is compounded by the operators impaired rearward vision. In contrast, the front discharge transit mixer apparatus permits a more rapid and exact approach, with an improved view of the raw material charging and concrete discharging location. The ability to more accurately position the front discharge mixer will allow for more accurate control over the discharge of the concrete to the job site, which in turn, will reduce the amount of labor required to finish the concrete.

While prior front discharge mixer apparatuses are steps in the right direction, there are still unmet needs in the transit mixer industry. The front discharge transit mixer of the present invention will address many of the unmet needs associated with prior front discharge transit mixers. The present invention satisfies these needs in a novel and unobvious way.

SUMMARY OF THE INVENTION

One form of the present invention contemplates a transit mixer apparatus for transporting and mixing concrete. The transit mixer apparatus comprising: a vehicle chassis having a front end portion and a back end portion; a first pair of wheels coupled to the front end portion for supporting the chassis; a second pair of wheels coupled to the back end portion for supporting the chassis, a rotatable concrete mixing drum coupled to the chassis; the concrete mixing drum having a front end positioned above the front end portion and a back end positioned above the back end portion, the mixing drum having an opening at the front end through which concrete may be loaded into or discharged from the drum, the mixing drum inclined upwardly toward the front end portion; an operator cab positioned at the front end portion for an operator to ride in; and, a contaminant control system coupled to the cab for delivering a fluid to a portion of the exterior of the cab so as to reduce contaminants getting on the portion of the exterior of said cab.

One object of the present invention is to provide an improved front discharge transit mixer apparatus.

Related objects and advantages of the present invention will be apparent from the following description.

BRIEF DESCRIPTION OF THE DRAWINGS

FIG. 9a is a front elevational view of the operator cab comprising a portion of the FIG. 1 front discharge transit mixer apparatus.

FIG. 9b is a side elevational view of the operator cab comprising a portion of the FIG. 1 front discharge transit mixer apparatus.

FIG. 9c is a rear elevational view of the operator cab comprising a portion of the FIG. 1 front discharge transit mixer apparatus.

DESCRIPTION OF THE PREFERRED EMBODIMENT

Figure 1:
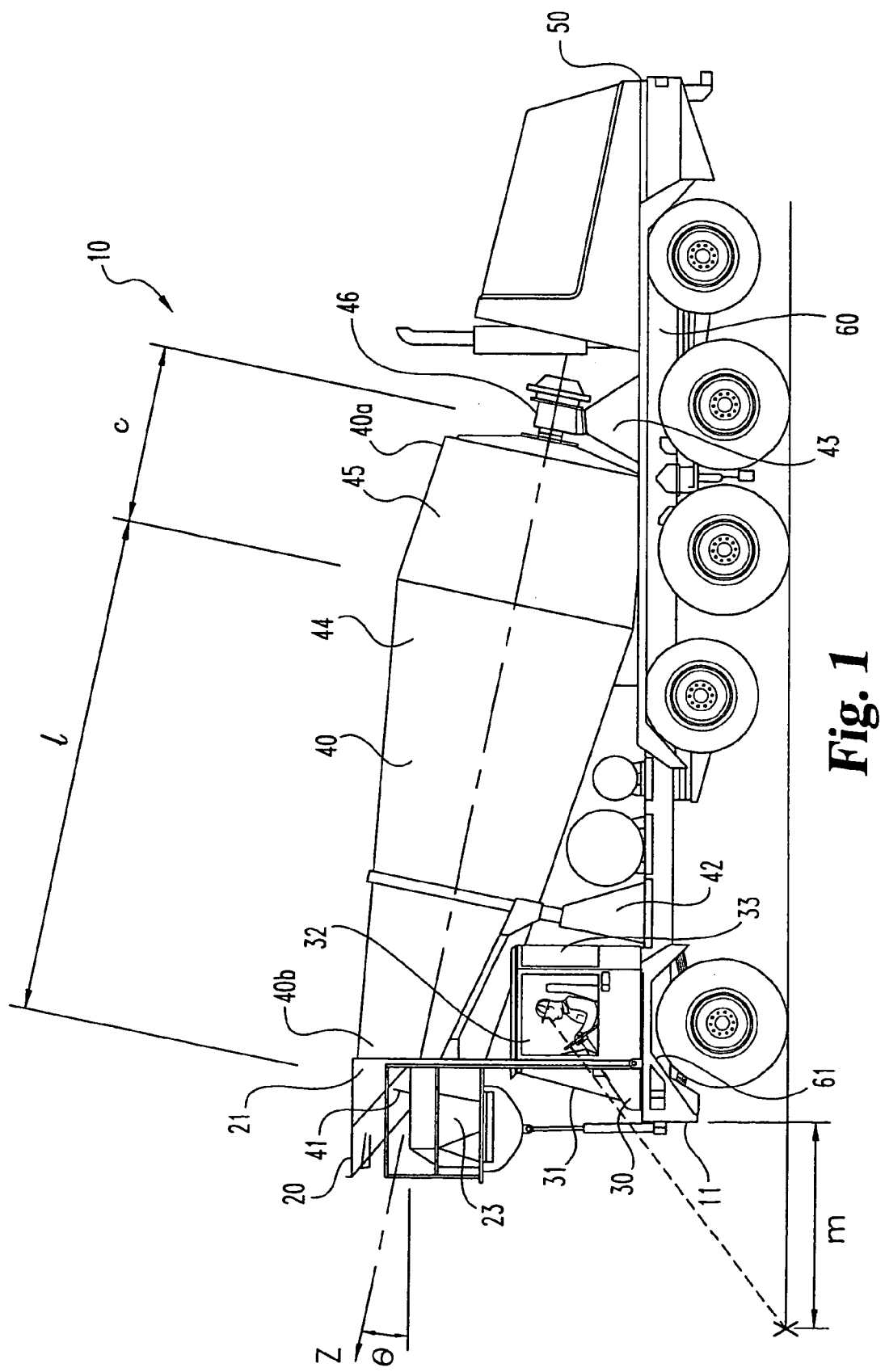
FIG. 1 is a side elevational view of a front discharge transit mixer apparatus of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

With reference to FIG. 1, there is illustrated a front discharge transit mixer apparatus 10. The front discharge transit mixer apparatus 10 being designed and constructed for mixing and transporting raw materials and/or concrete to a job site. While the invention was designed for transporting raw material and concrete it has applications for the movement of fertilizer, limestone, rock, and sewage. Further, in an alternate embodiment the transit mixer apparatus 10 is utilized to spread sand, salt, gravel, or other products on a road surface during the winter season. The front discharge transit mixer apparatus 10, includes a charging hopper 20, an operator cab portion 30, a mixing barrel 40, a power plant portion 50, and a vehicle chassis and drive train 60.

The moveable charging hopper 20 is utilized to receive and convey raw materials, such as cement, aggregate, sand, etc., from a filling location to the interior volume of the mixing barrel 40. A filling location includes, but is not limited to, a concrete batch plant. In one form of the present invention the charge hopper 20 is pivotally mounted to a supporting structure 21 that is coupled to the vehicle chassis 60. Charging hopper 20 having an extended tongue (not illustrated) that is moveable through an opening 41 at the front end of the mixing barrel, and continuing into the interior volume of the mixing barrel 40 to facilitate the placement of raw materials therein. Upon preparing to discharge a batch of concrete, the charging hopper 20 is pivoted to remove the tongue from the mixing barrel 40, thereby allowing the discharge of the concrete from the mixing barrel 40 with a minimum of interference.

The mixing barrel 40 which is of a generally well known design has a back end 40a and a front end 40b. Mixing barrel 40 being supported and rotatable on a front mixing barrel mount 42 and a rear mixing barrel mount 43. The mixing barrel having two frustum-conical portions 44 and 45 that are joined together to form the mixing barrel. The first portion 44 having a longitudinal length 'l', the second portion 45 having a length 'c'. A rotation means 46 is utilized to rotate the mixing barrel 40 about a centerline z, and in the preferred embodiment the rotation means 46 is a hydraulic motor. The mixing barrel's front end 40b is inclined upwardly relative to the back end 40a, and in the preferred embodiment is inclined at an acute angle θ. It is preferred that angle θ is about 12°. It is understood that other values for θ, and other mixing barrel designs are contemplated herein.

Operator cab 30 is located at the front end 61 of the vehicle chassis 60. Cab 30 having an interior operator space for accommodating an operator who controls the front discharge transit mixing apparatus 10. The cab 30 has a six-sided surround vision which includes a large front windshield 31, a pair of side windows 32 (only one illustrated), and a pair of rear side windows 33 (only one illustrated). The enhanced field of view through the surround vision includes the ability for a typical operator sitting in a normal driving position (one who is of normal size, proportions, and senses) to see a marking X located a distance m from the front end 11 of the transit mixer 10. The marking X being a relatively flush marking located on the surface over which the transit mixer will pass. In one form of the present invention the distance m is about five feet. Further, the interior operator space extending to within six inches from the front end 11 of the transit mixer 10.

Power plant 50 is coupled to the chassis 60 and provides the motive power to propel the transit mixing apparatus 10 to the job site. The transit mixer apparatus 10 being designed to operate on a litany of surfaces including paved roads, unpaved roads, and undeveloped land. In the preferred embodiment the power plant 50 includes a water cooled internal combustion engine and transmission for delivering power to a plurality of drive axles on chassis 60.

Figure 2:
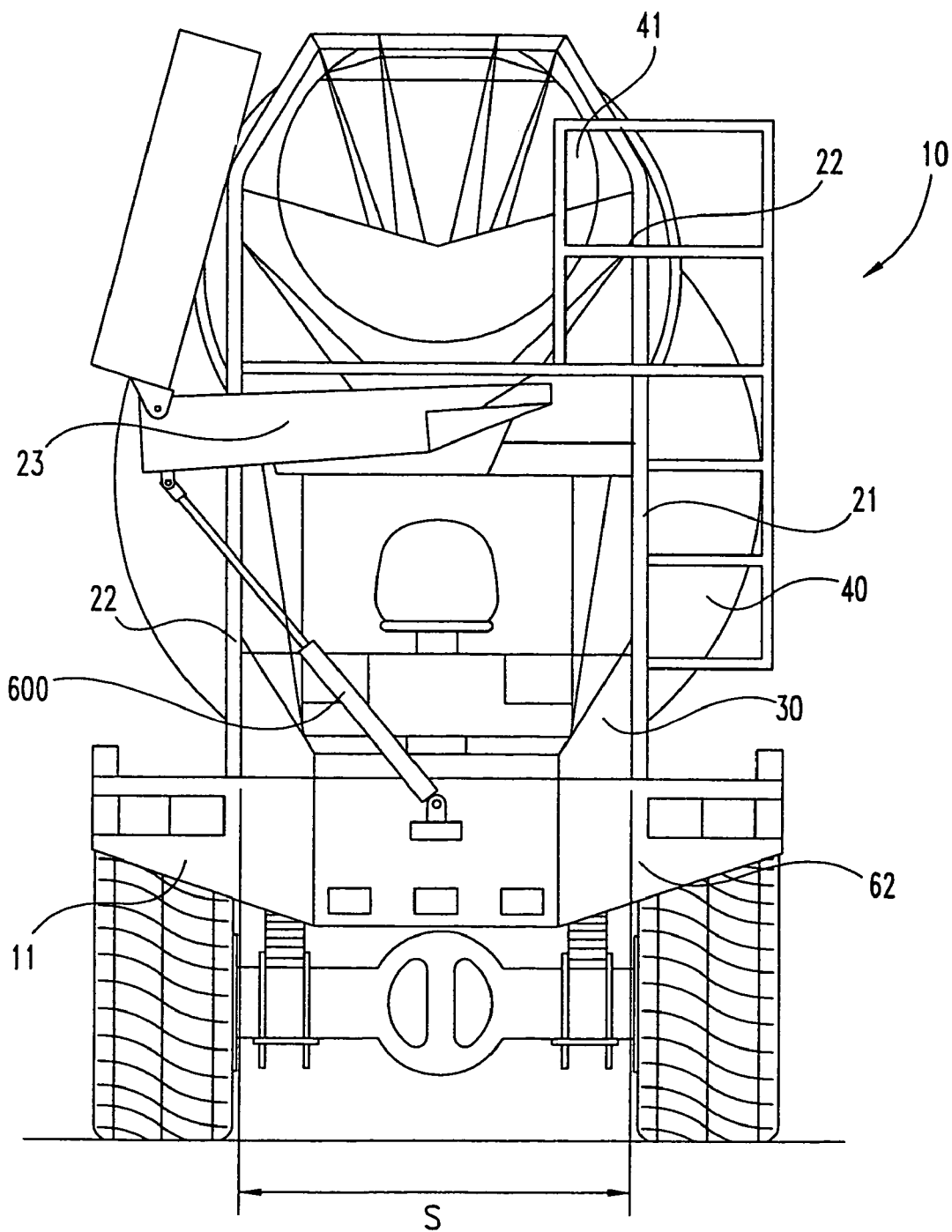
FIG. 2 is a front elevational view of the FIG. 1 front discharge transit mixer apparatus.

Referring to FIG. 2, there is illustrated a front elevational view of the front discharge transit mixer apparatus 10. The moveable charging hopper 20 is coupled to the supporting structure 21 which includes a pair of spaced upstanding structural supporting members 22 that are coupled to a pair of brackets (not illustrated) that connect to the chassis 60. The upstanding structural supporting members 22 are spaced a distance 's' apart to allow a wider cab 30 to be placed therebetween. In the preferred embodiment the distance 's' is about 65 inches. A pivotable front discharge chute 23 is coupled beneath the barrel opening 41 to receive the concrete being discharged from the barrel and convey it to the finishers at the job site. There are a multitude of chute designs that are capable of being coupled with the pivotable front discharge chute 23, and these types of chute designs are generally known to those of ordinary skill in the art. A front lift 600 is coupled between the chassis 60 and the pivotable front discharge chute 23. The front lift 600 being extendable and rotatable with the chute. In the preferred embodiment the front lift 600 is hydraulically actuated. Extension or retraction of the front lift 600 will cause the raising or lowering of chute 23. A wrap around front bumper 62 provides protection for the front end 11 of the transit mixer apparatus 10. The front bumper 62 being designed for ease of removal to allow access to the chassis 60.

Figure 3:
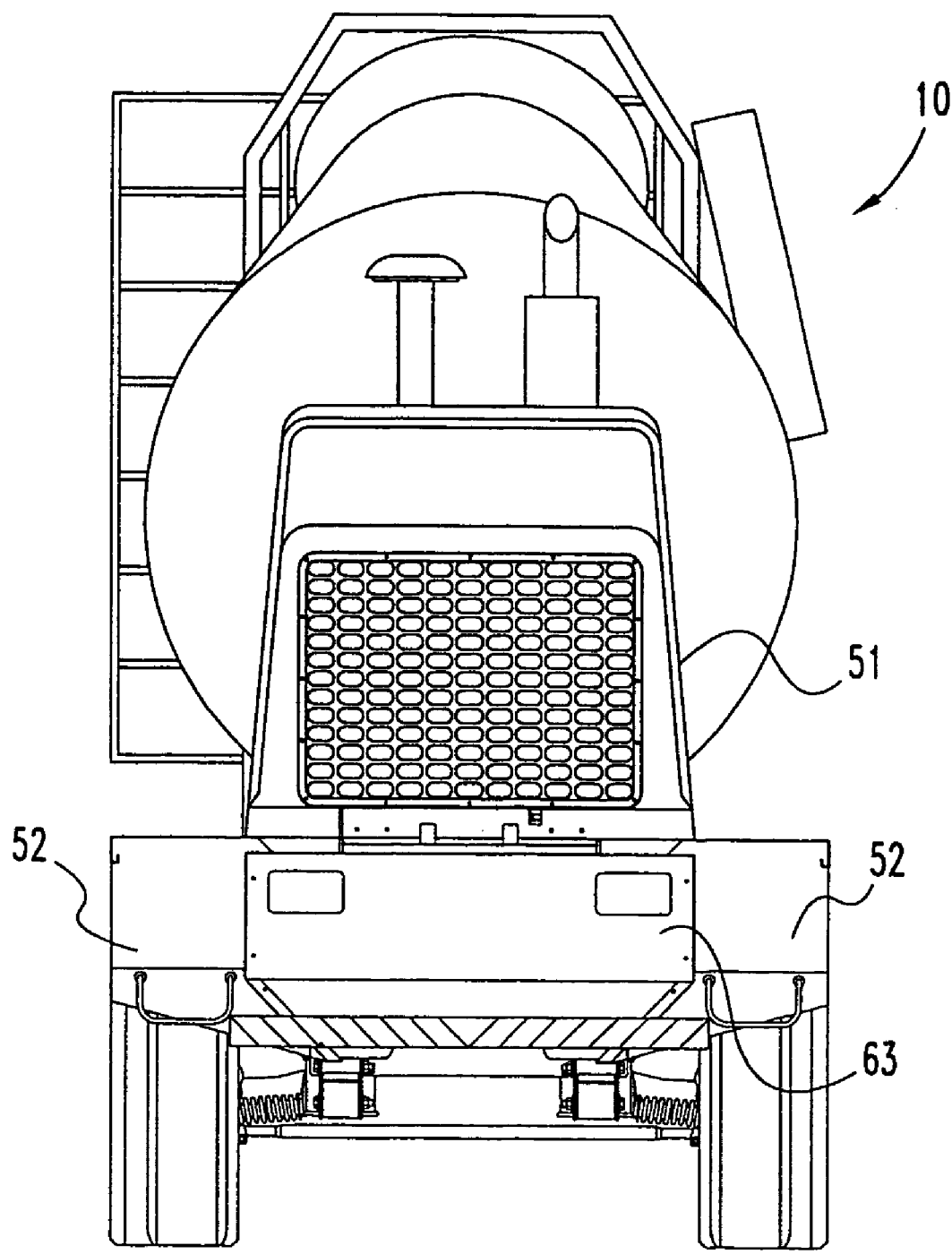
FIG. 3 is a rear elevational view of the front discharge transit mixer apparatus of FIG. 1.

With reference to FIG. 3, there is illustrated a rear elevational view of the front discharge transit mixer apparatus 10. The front discharge transit mixer apparatus 10 having a wide low profile hood 51 that encloses storage boxes, tool boxes, and the battery. The storage boxes, tool boxes and battery being protected by the hood 51 from the environment and unauthorized access. A rear frame shroud 52 covers the chassis 60 and extends to the rear bumper 63.

Figure 4:
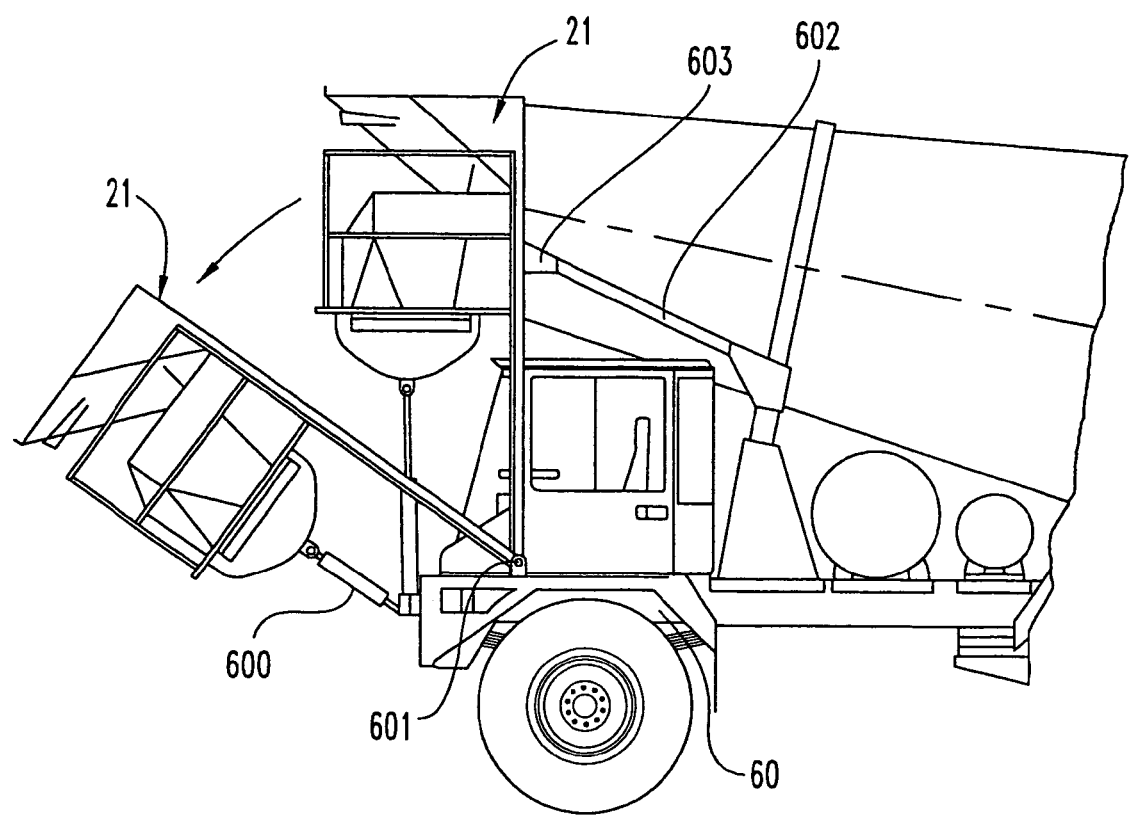
FIG. 4 is an illustrative side elevational view of the transit mixer of FIG. 1 with a pivotable front tower structure depicted in a first upright position and in a second rotated position.

With reference to FIG. 4, there is illustrated one form of the supporting structure 21 that is pivotally coupled to the vehicle chassis 60. In the preferred embodiment a pin and clevis assembly 601 holds the supporting structure 21 to the vehicle chassis 60. Upon removal of a plurality of fasteners the supporting structure 21 is uncoupled from a second series of support members 602 thereby allowing the supporting structure 21 to rotate to a forward folded position. It is understood herein that the support structure is only illustrated in two positions, however there are an infinite number of positions between the fully upright position and the fully folded position. Further, the front lift 600 is designed such that it can raise and lower the support structure 21 as the structure is rotated between positions. In one embodiment the chute 23 is rotated to a forward position, thereby placing the front lift 600 in a position for raising and lowering the supporting structure 21. Upon the removal of the fasteners and the actuation of the front lift 600, the supporting structure 21 can be rotated downward so as to allow access to the apparatus 10.

Figure 4A:
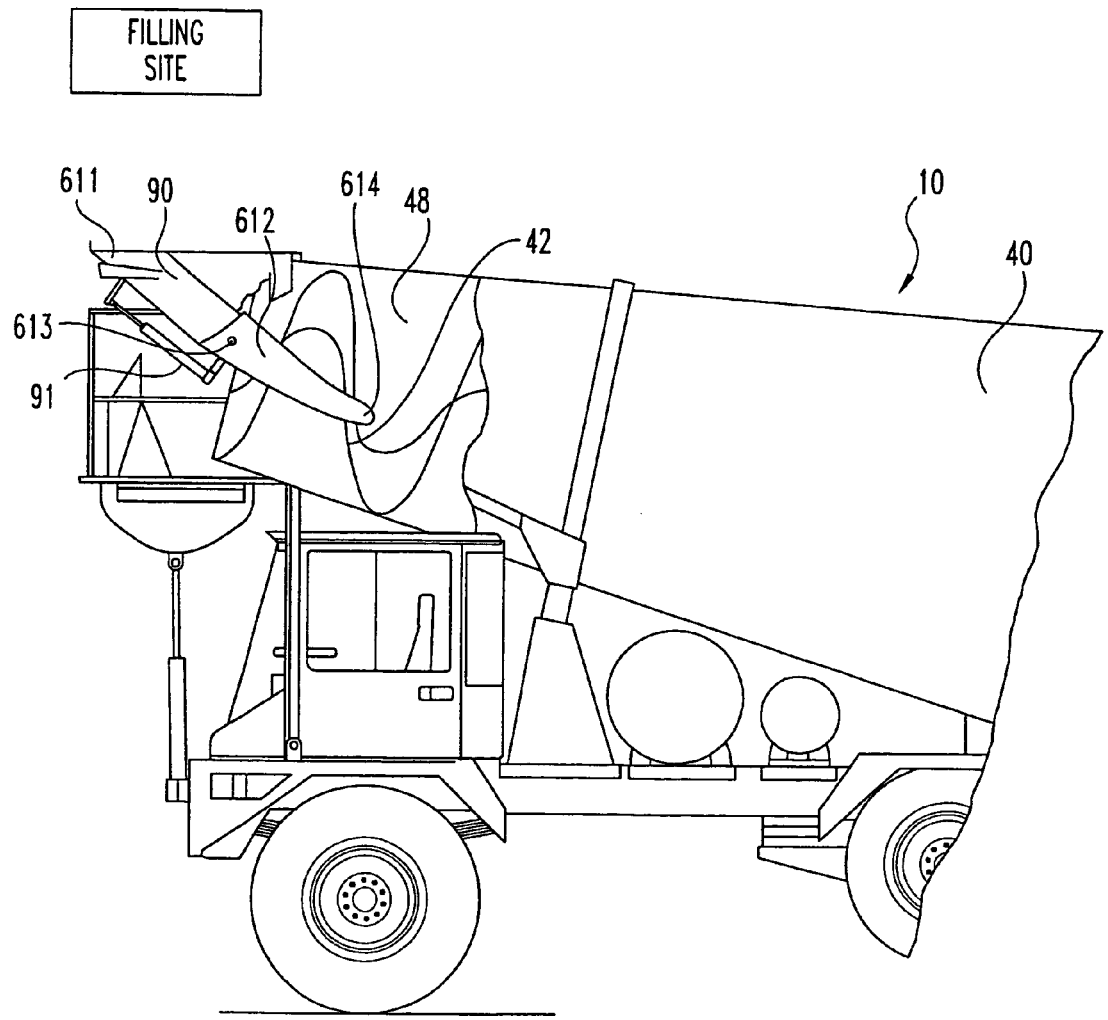
FIG. 4a is a partial side elevational view of a front discharge transit mixer having a charging hopper with a pivotable tongue portion that is in a first lowered charging position.
Figure 4B:
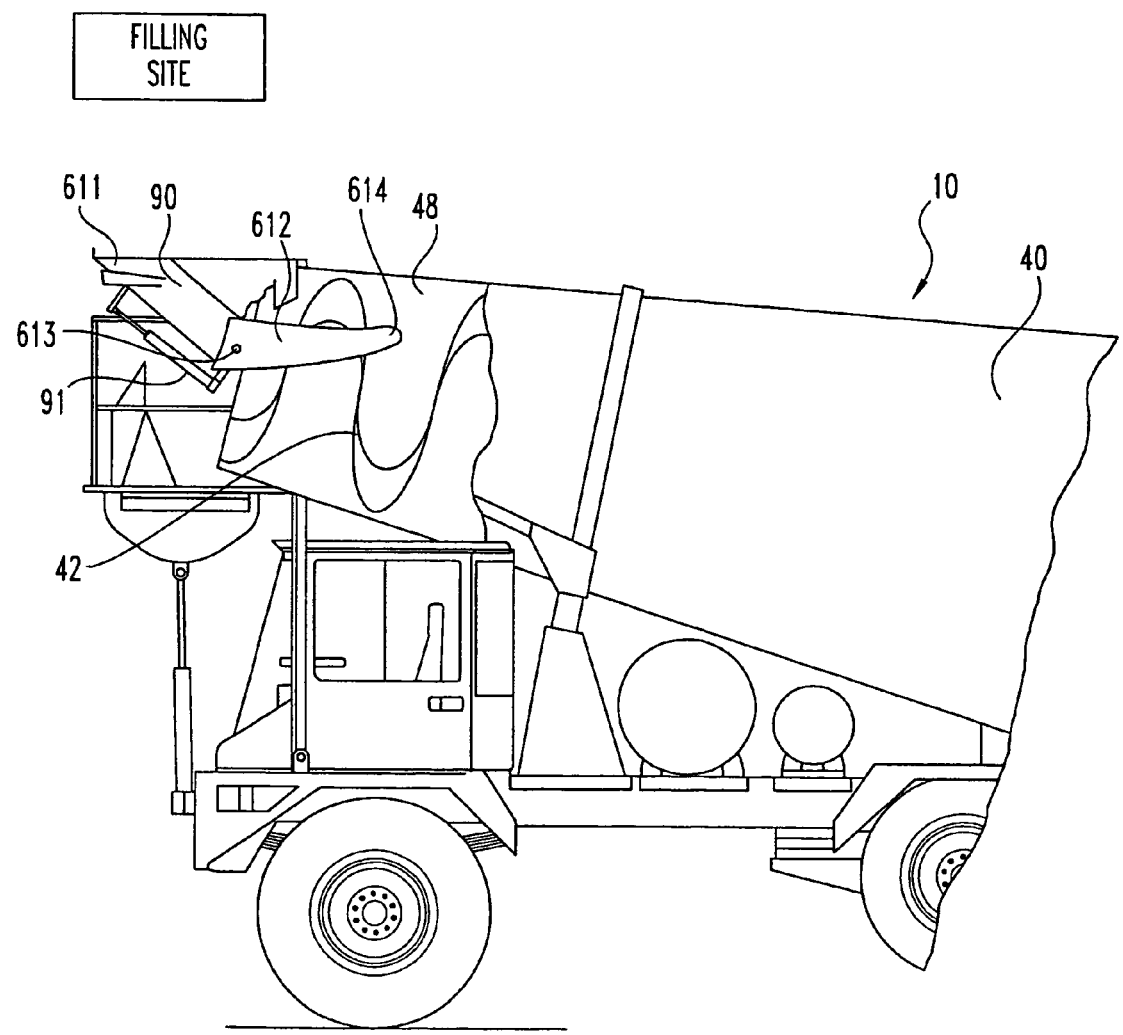
FIG. 4b is a partial side elevational view of the FIG. 4a front discharge transit mixer with the pivotable portion of the charging hopper in a second elevated discharging position.

With reference to FIGS. 4a and 4b, there is illustrated a partial side elevational view of the transit mixer apparatus 10 having an alternative embodiment of charging hopper 90 coupled thereto. A mechanical actuator 91 is coupled between a stationary portion of the hopper 90 and a moveable portion 612 of the hopper 90. In the preferred embodiment, the actuator 91 defines a hydraulic cylinder that is moveable between an extended and retracted position so as to cause the moveable tongue portion 612 to pivot about a pivot point 613. The moveable portion 612 being pivotally coupled to the stationary portion 611 of the hopper 90. However, it is understood that other actuators capable of causing the moveable portion 612 to pivot such that it's distal end 614 is raised in a substantially vertical direction are contemplated herein. The stationary portion 611 is for receiving materials from a filling site to charge the mixing barrel 40 with raw materials.

In order to facilitate filling of the barrel 40 the actuator 91 is retracted to cause the moveable portion 612 of the hopper 90 to rotate in a clockwise direction about pivot point 613 so that the distal end 614 extends beyond the second helical flight 42 in the barrel 40. Charge hopper 90 is not intended to contact the helical flight or the inner surface 48 of the barrel. After the mixing barrel 40 has been charged with raw materials the mechanical actuator 91 is actuated so that it extends and causes the moveable portion 612 to rotate in a counterclockwise direction about pivot point 613. This counterclockwise rotation causes the substantial vertical movement of the distal end 614 away from the helical flights within the barrel 40, thereby to allowing the subsequent discharge of material from the barrel with minimum interference. More specifically, in FIG. 4b, the moveable portion 612 is illustrated in a second raised position, where the distal end 614 is moved vertically away from the helical flights so as to minimize the interference between the concrete being discharged and the hopper 90.

In a preferred form of the present invention the helical flights (such as helical flight 42) extend about eleven inches from the inner surface 48 of the mixing barrel. During charging of the mixing barrel it is preferred that the distal end 614 is maintained about one inch from the helical flight 42. In the second discharging position utilized for discharging material from the mixing barrel it is preferred that the distal end 614 is spaced about six inches from the helical flights to allow for the passage of material therebetween. It is understood herein that the movement between the first position and the second position includes rotation about pivot point 613 such that the distal end 614 is moved in a substantially vertical direction so as to change the clearance between the helical flights and the moveable portion 612 of the hopper 90.

Figure 5:
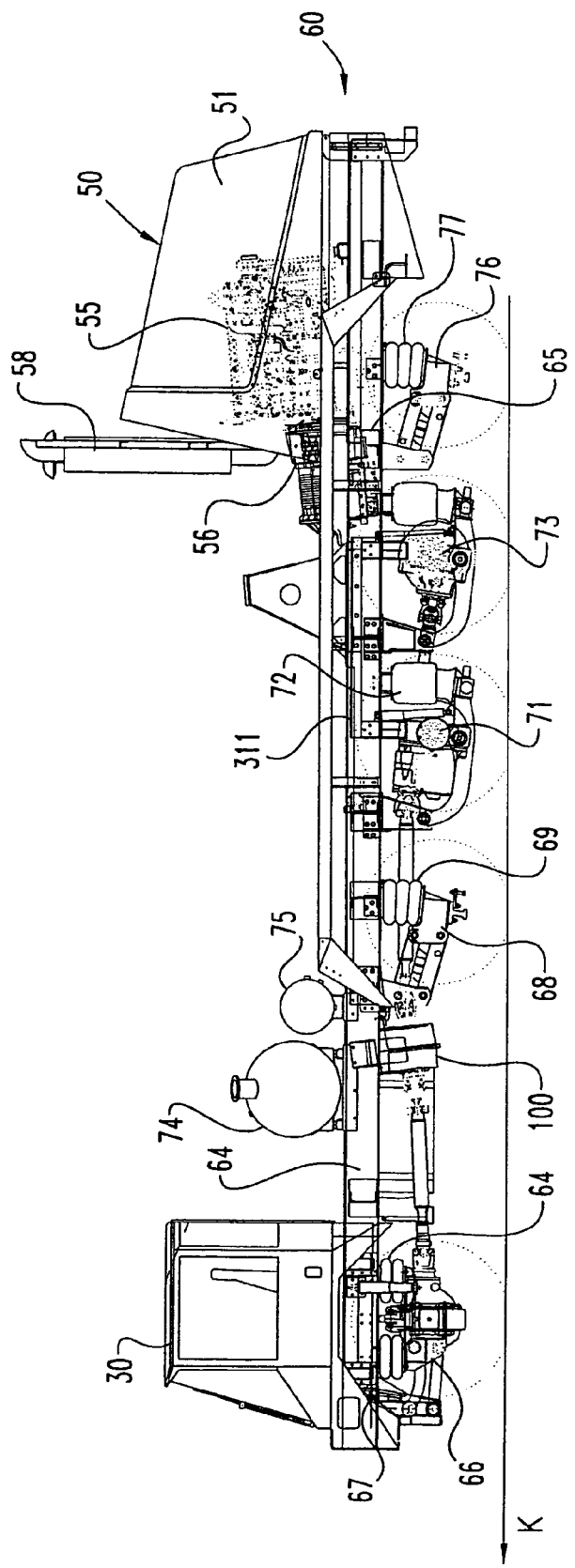
FIG. 5 is a side elevational view of the chassis and drive train comprising a portion of the FIG. 1 front discharge transit mixer apparatus.
Figure 6:
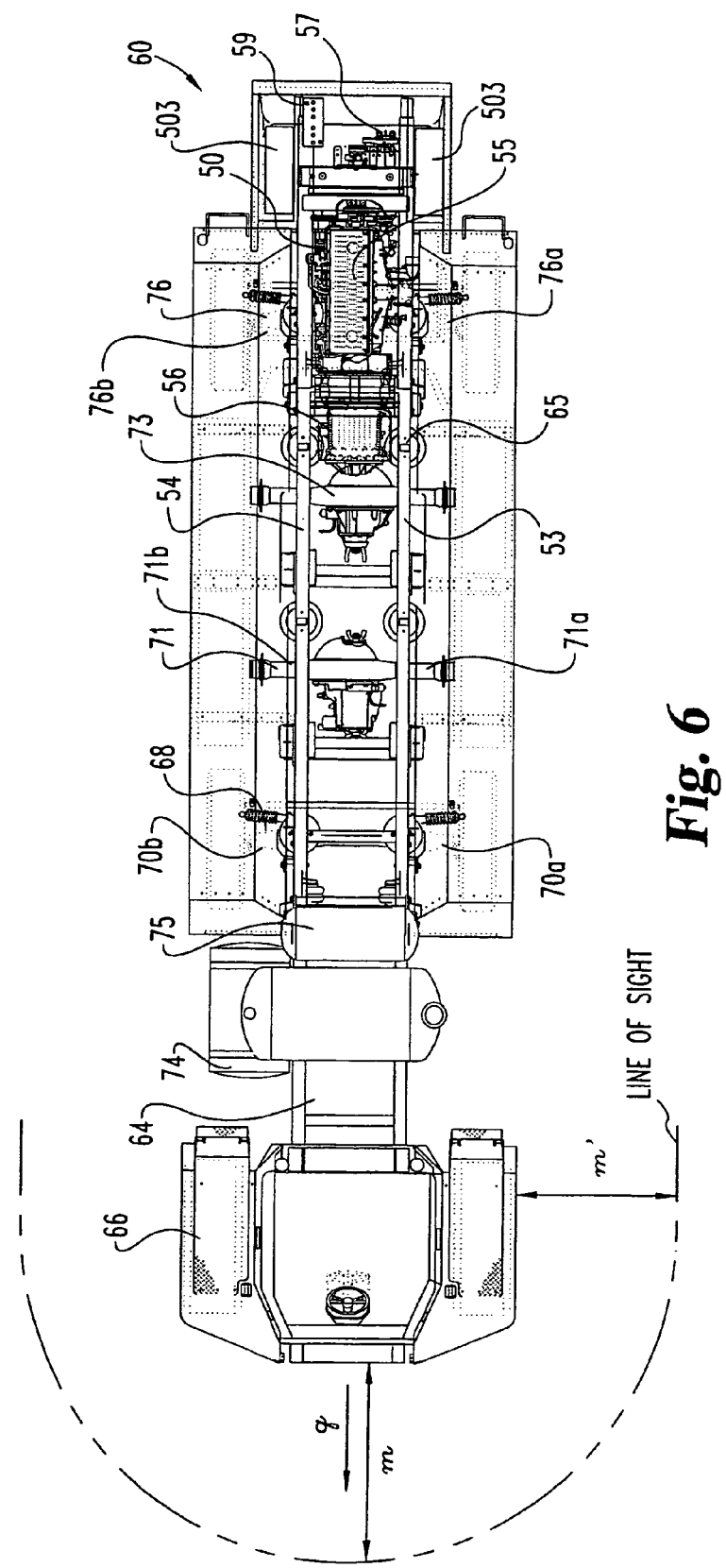
FIG. 6 is a top plan view of the chassis and drive train comprising a portion of the FIG. 1 front discharge transit mixer apparatus.

With reference to FIG. 5 and FIG. 6, there is illustrated the vehicle chassis 60. The chassis 60 includes a pair of spaced parallel substantially elongated structural members 53 and 54. In the preferred embodiment the members 53 and 54 are u-shaped (channel) frame rails that are oriented substantially parallel to a reference plane K. A pair of storage compartments/tool boxes 503 are positioned within the chassis 60 and covered by the hood 51 when it is closed. The design and construction of chassis 60 includes structural cross members to obtain the desired structural characteristics. Further, chassis 60 has a longitudinal centerline q. In one form of the present invention the chassis has a steering angle in the range of 25–35°. It is more preferred that the steering angle be about 35°. However, other steering angles are contemplated herein.

A plurality of axle assemblies are coupled to the chassis by suspension components to enable the apparatus 10 to roll. The chassis 60 having a front portion 64 and a back portion 65. In describing of the suspension components associated with the plurality of axles hereinafter, generally only one side of the axle will be set forth as the other side is substantially identical. A first drive axle assembly 66 is coupled to the front portion 64 of the chassis 60. The first drive axle assembly 66 includes a pair of driven axles that transmit the driving power from the power plant 50 to the vehicle wheels and tires. A pair of air springs 67 are positioned between each axle of the drive axle assembly 66 and the respective structural members 53 and 54. In the preferred embodiment there are four air springs 67 coupled to the first drive axle assembly 66. A plurality of suspension links, including beams and torsion bars are utilize to complete the drive axle assembly 66. The air springs 67 allow the monitoring of pressure, the selective variation of pressure therein, the ability to raise and lower the apparatus 10, and a way to change the load carried by each axle. In an alternative embodiment conventional leaf springs are positioned between each axle and the respective structural members 53 and 54.

A second axle assembly 68 is coupled to the chassis 60 and is a non-drive axle that functions to distribute the load of the apparatus 10 on the surface beneath it. An air spring 69 is disposed between each side of the axle 70a and 70b and the respective structural members 53 and 54. Thus, in the preferred embodiment the second axle assembly 68 has a pair of air springs 69 that allow the monitoring of pressure therein, the selective variation of pressure therein, the ability to raise and lower the apparatus 10, and a way to change the load carried by each axle.

A third axle assembly 71 is coupled to the chassis and is a drive axle assembly that includes a pair of driven axles for transmitting power to the assemblies wheels and tires. An air spring 72 is disposed between each side of the axle assembly 71a and 71b and the respective frame rails 53 and 54. Thus, in the preferred embodiment the third axle assembly 71 has a pair of air springs 72 associated therewith that allow the monitoring of pressure, the selective variation of pressure therein, the ability to raise and lower the apparatus 10, and a way to change the load carried by each axle. Positioned longitudinally from the third axle assembly 71 is a fourth axle assembly 73. The fourth axle assembly 73 is substantially identical to the third axle assembly 71.

A fifth axle assembly 76 is coupled to the chassis 60 and is a non-drive assembly that functions to distribute the load of the apparatus 10 to the surface beneath it. An air spring 77 is disposed between each side of the axle 76a and 76b and the respective structural members 53 and 54. Thus, in the preferred embodiment the fifth axle assembly 76 has a pair of air springs 77 that allow for variations in the height and the load carried by the axle assembly. The fifth axle assembly 76 is coupled proximate the back end portion 65 of the chassis 60. Further, the fifth axle assembly 76 is substantially identical to the second axle assembly 68.

In the preferred embodiment of the present invention each of the axle assemblies is independently controlled to allow the operator to adjust the inflated height of the air spring, the pressure within the air spring, and the load carried by each axle. In one form of the present invention the suspension includes air springs from each axle assembly, thus a total airride is obtained. Further, each air spring is independently controlable to allow for vertical movement of each axle, pressure change for each axle as necessary to meet load and operating conditions. Further, the provision of a total air ride system will enable a weight system to be controlled by the operator. The apparatus 10 of the present invention contemplates other axle configurations, and is not intended to be limited to five axle assemblies. In an alternate form of the present invention axles supported by other means than air springs is contemplated. Further, a hybrid chassis in which some axles are supported by conventional springs and others are supported by air springs is contemplated herein.

The power pack module 50 includes an internal combustion engine 55, a multi-speed transmission 56, a hydraulic pump 57, an exhaust stack 58 and a battery 59. The power from the engine 55 is transmitted through a drive train including drive shafts, universal joints, and a transfer case 100. Transfer case 100 is utilized in a conventional fashion to enable power to be transmitted to the plurality of drive axles located along the chassis 60. The engine and drive train configurations are considered to be within the scope of a person of ordinary skill in the art.

A fluid reservoir tank 74 is mounted upon the chassis 60 to hold a quantity of fluid therein, and in one embodiment the fluid is water and the tank is sized to hold about 150 gallons thereof. The liquid within the tank is pressurized so that a discharge of pressurized liquid can be made from the mobile vehicle. A second fluid reservoir 75 is mounted upon the chassis 60 to hold compressed gas, and in the preferred embodiment the compressed gas is air. An onboard air compressor (not illustrated) is provided for compressing air for use by the plurality of pneumatic operated devices on the chassis, including air springs, air brake booster, pneumatic cylinders, etc.

With reference to FIGS. 1 and 6 there is illustrated a depiction of the surround vision associated with cab 30. The surround vision enables a typical operator normally seated in an operating position (one who is of normal size, proportions, and senses) to see a marking located a distance from the cab of the transit mixer. The marking being a relatively flush marking located on the surface over which the transit mixer will pass. In one form of the present invention the distance m is about five feet and the distance m' is about four feet.

Figure 7:
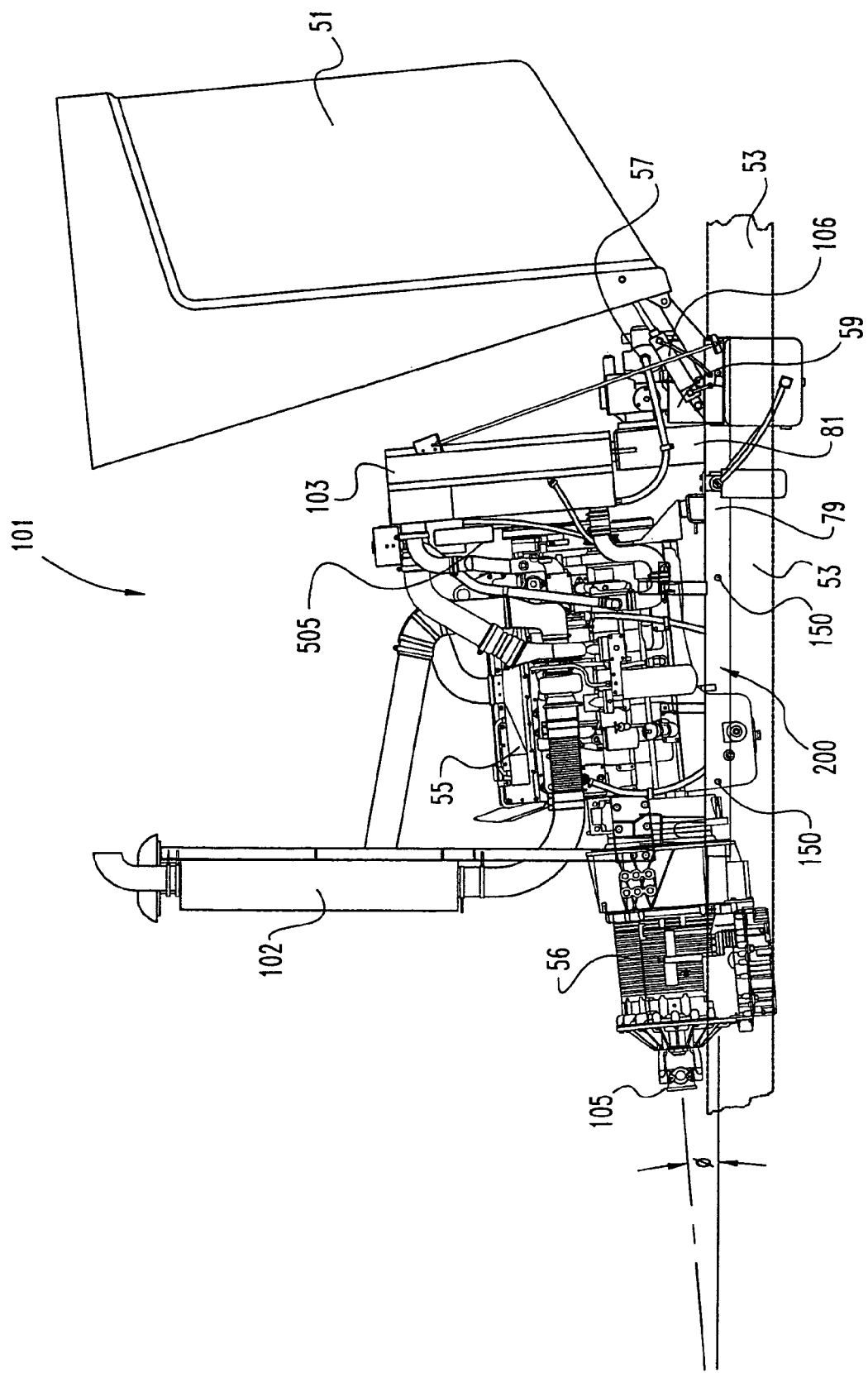
FIG. 7 is a side elevational view of a power pack module comprising a portion of the FIG. 1 front discharge transit mixer apparatus.
Figure 8:
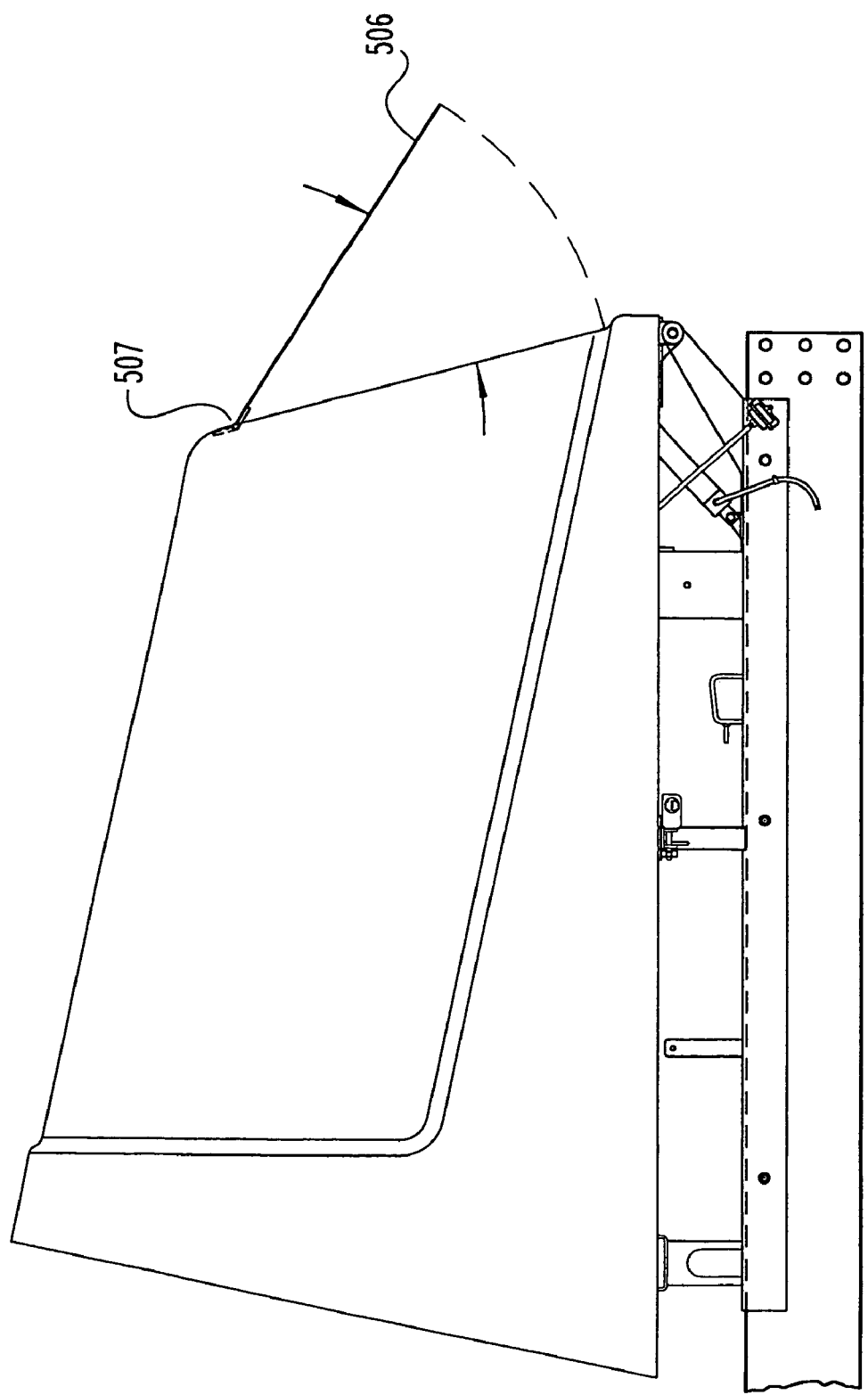
FIG. 8 is a side elevational view of the moveable rear grill comprising a portion of the FIG. 7 unitary power pack module.

Referring to FIGS. 7 and 8, there is illustrated a side elevational view of a removable modular power pack assembly 101 that is removeably coupled to the structural support members 53 and 54. The power pack assembly 101 includes, but is not limited herein to, the internal combustion engine 55, transmission 56, exhaust stack 102, radiator 103, hydraulic pump 57, and a battery 59 (FIG. 6). Coupled to and extending from the internal combustion engine 55 is a radiator fan (not illustrated) that is disposed within a radiator fan shroud 54 that connects to the radiator 103. An air conditioning condensor 505 mounted between the fan and the internal combustion engine 55. The fan acting to draw air across the condensor 505 to extract heat therefrom. In one form of the present invention the radiator 103 is a cross flow radiator, that by definition has the coolant passing substantially horizontally.

In one form of the present invention the power pack assembly 101 defines a structural framework 200 having a pair of opposed rails 79 and 80 (not illustrated) that extend along the structural member 53 and 54 at the back end potion 65 of the chassis 60. Further, the power pack frame has a cross member 81 that extends between the opposed frame rails 79 and 80 and supports radiator 103 thereon. A hydraulic pump 57 is coupled to and supported by the crossmember 81. The hydraulic pump is utilized to supply pressurized hydraulic fluid to components within the front discharge transit mix apparatus 10, such as the hydraulic motor 46 that causes rotation of the mixing barrel 40. The power pack assembly 101 is removable from the chassis 60 by the disconnection of the driveshaft connecting to the universal joint 105, uncoupling of some fluid and electrical lines, and uncoupling a plurality of the fasteners 150 passing through the frame rails 79 and 80 and into the chassis structural support member 53 and 54. In the preferred embodiment, the power pack assembly 101 is removable as an integral unit including the hood 51, the above power pack components, and the mechanical actuation system 106 for raising and lowering the hood. Further, in another form of the present invention the mechanical actuation system 106 is defined by a pneumatic cylinder that is coupled between the power pack framework 200 and the hood 51. Actuation of the pneumatic cylinder will raise and lower the hood 51 as required by the machine operator. In a preferred embodiment, the mechanical actuator 106 is activated by a push button located on the hood to allow the hood 51 to pivot to an open position.

In one form of the transit mixer apparatus 120 the grill assembly 506 is pivotally coupled to the hood 51. Rotation of the grill assembly 506 away from the hood 51 allows access to portions of the power pack assembly 101 without having to open the hood 51. A hinge 507 couples the grill assembly 506 to the hood 51. In an alternate embodiment a removeable grill assembly is utilized.

With reference to FIGS. 9a, 9b, and 9c, there is illustrated the modular operator cab unit 30 that is coupled to the chassis 60 by conventional body shock mounts. In the preferred embodiment the cab 60 is made of a corrosion resistant material, such as stainless steel, fiberglass, or a composite material. In the preferred embodiment the cab is formed of stainless steel. Further, the cab 30 has an enlarged volume, and it is more preferred that the cab have a volume of about 93.2 cubic feet, and a glass surface area of about 37.4 square feet. The ratio of the surface area of glass to volume of the cab is greater than 0.33/(unit of length). It is more preferred that the ratio of the surface area of glass to the volume of the cab is about 0.40/(unit of length). Other surface areas of glass and cab volumes are contemplated herein, provided they enable the necessary operator room and enhanced visability for the operator.

Cab 30 has a plurality of windows mounted for enhancing the operators field of vision. More specifically, a surround vision for the operator is created by having large window surface areas on six sides of the cab. The large window surface areas include the front windshield 31, a pair of side windshield fairing 34, a side door glass 32, an opposing side window on the body (not illustrated) and a pair of side light windows 33 (only one illustrated on the sides of the cab). Further, there is a pair of back light windows 35. The large surface area of glass contributes to the operator's ability to more easily see and control the environment in which he is working.

In one form of cab 30 there is coupled thereto a contaminant barrier system 35. The contaminant barrier system 35 is for dispensing a fluid over at least a portion of the cab to prevent the contamination of the cab with dust and foreign particles from the environment. More particularly, the contaminant barrier system 35 is designed to minimize the depositing of raw materials from the filling site (batch plant) onto the cab 30. The operator can activate the contaminate barrier system 35 as required to thwart the depositing of material on the cab 35. Further, the contaminant barrier system 35 can be activated at other times as deemed necessary by the operator.

A fluid conduit 36 wraps around three sides of the cab 30 and is located at the upper portion of the cab 30 in about the same location where a drip rail is normally positioned. The contaminant barrier system 35 is well suited for preventing contamination of the cab 30 while the charging hopper is being filled under a batching station. The fluid conduit 36 carries a pressurized fluid to a plurality of apertures 37 that are spaced along the fluid conduit 36. In one form of the present invention the apertures 37 are about 0.060 inches in diameter. It is preferred that the fluid for dispensing comes from the storage tank 74, however it is contemplated that external sources of fluid could be utilized with the contaminant barrier system 35.

In a more preferred form of the present invention, the fluid circulating through the fluid conduit 36 is pressurized water that is discharged through apertures 37 that are oriented vertically downward to spray a mist across the body. The fluid mist extends across the surface area of the glass windows. Other liquids are contemplated for circulation through the conduit 36, including cleaning agents, antifreezes, etc. The fluid exiting the apertures 36 provides a water barrier to minimize or block the transmission of dust and debris onto the exterior surface of the cab 30, the exterior surface includes windows, doors and the cab body excluding the roof. Fluid conduit 36 is also in fluid communication with the pressurized gas stored in tank 75. In the preferred embodiment the pressurized gas is air. However, other types of gases are contemplated herein.

One application of the contaminant barrier system 35 is to discharge liquid, preferably water, from the plurality of apertures 37 so as to provide a liquid barrier to minimize or prevent contaminants from contacting the exterior surface of cab 30. Upon completion of the liquid discharge portion of the operator can activate the delivery of the compressed gas through the fluid discharge conduits 36 and apertures 37 in order to dry the cab surface. Further, in another embodiment the deployment of compressed gas is contemplated as the fluid to prevent the contamination of the cab with foreign material.

Figure 10:
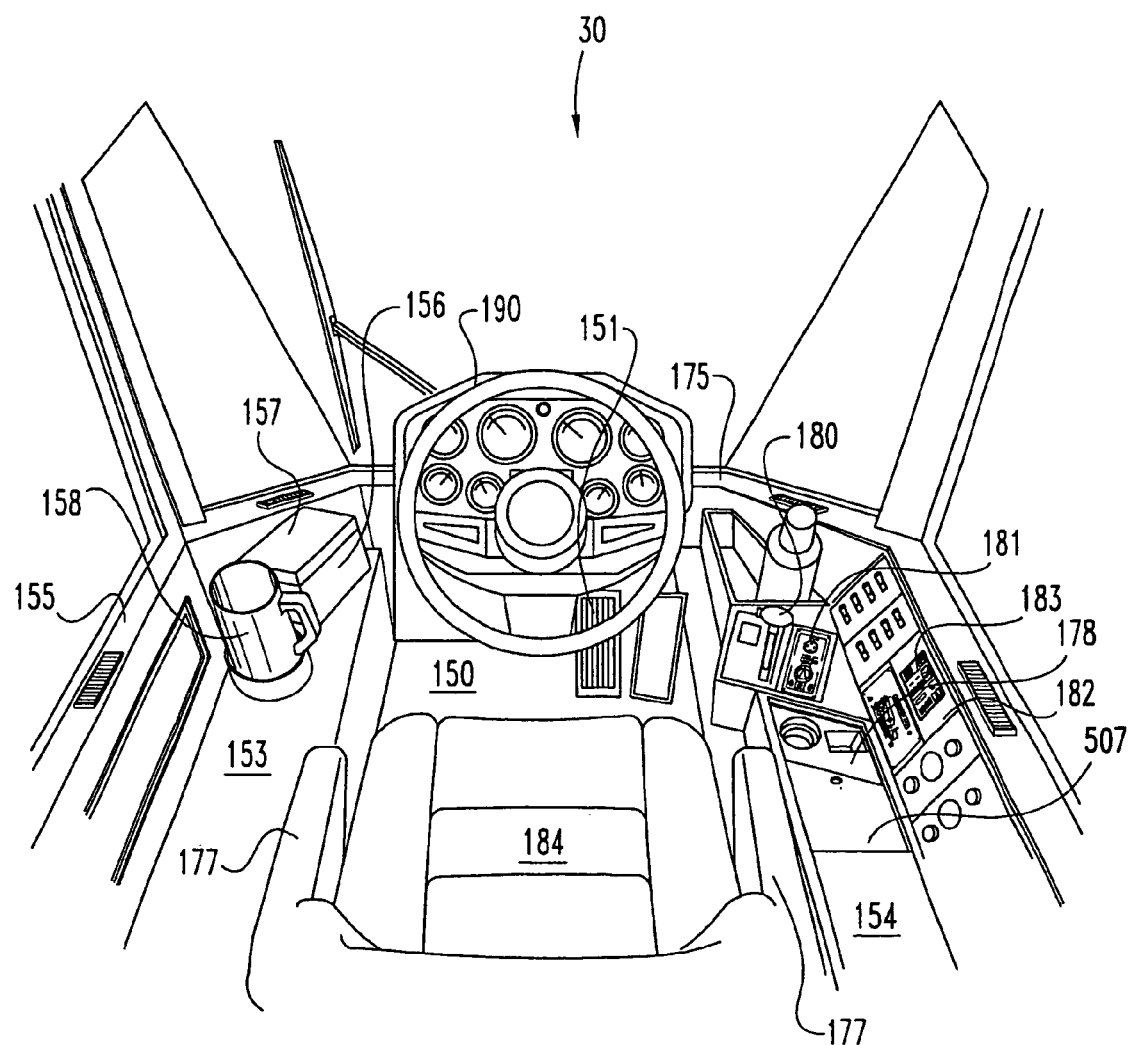
FIG. 10 is a perspective view of the interior of the operator cab comprising a portion of the FIG. 1 front discharge transit mixer apparatus.

Referring to FIG. 10, there is illustrated an interior perspective view of a portion of the operator cab 30. The operator cab 30 has a floorboard 150 that is substantially parallel to the top of the chassis 60. The provision of a substantially flat floorboard 150 will allow the brake booster 151 to be mounted in a horizontal position. Further, in one form of the present invention the floorboard 150 is mounted such that it is positioned beneath the top of the chassis 60. The positioning of the floorboard 60 beneath the top plane of the structural members 53 and 54 allows for an extended cab interior height without increasing the overall height of the apparatus 10. The front discharge transit mixer 10 has been designed to have a minimum height less than about 13 feet and one inch, which will allow it to pass beneath concrete patching plants, and meet the Department of Transportation's specification for bridge heights. Further, in an alternate embodiment having air springs the minimum height is designed to be about twelve feet ten inches. It is understood herein that other floor configurations are contemplated for the operator cab.

The location of the operator seat 152, on the floorboard 150 that descends beneath the plane at the top of the structural member 53 and 54, enables an operator, normally positioned within the seat to sit in an upright fashion without engaging the ceiling of the cab with their head. For clarity, the operator is a normal-sized, normal proportioned person less than six feet in height. Positioned on either side of the operator are operator comfort consoles 153 and 154. The comfort console 153 is formed adjacent an operable door 155 that allows the passage of parties into and out of the cab 30. In one form of the present invention, a liquid refreshment cooler holder 156 is coupled to the cab 30. The liquid refreshment cooler holder 156 is designed and configured to receive a readily available cooler 157. In a preferred embodiment the cooler holder 156 is integrally formed with the comfort console 153. Positioned proximate the refreshment cooler holder 156 is a bulk beverage holder 158. The bulk beverage holder 158 is designed to hold a quantity of fluid for consumption by finishers at the jobsite. The second operation comfort console 154 includes a plurality of modular instruments and control panels for which the operator can control the operation of the apparatus 10. More particularly, creature comfort portion 67 has a plurality of storage holders for creating a more enjoyable and comfortable environment for the operator. Positioned proximate the front 175 of the cab 30 is a storage compartment 176 for storing items that are desirable to keep within reach of the operator. Positioned adjacent the armrest 177 of the cab is a storage compartment 178 with a sliding lid 507 for placing documents, records and other information that the operator may need to transact business at the customer's location. Positioned within the storage compartment 178 is a beverage cup holder and other storage compartments.

Positioned at an ergonomically preferred location is the drive train selector 180 and a mixing apparatus control 181. Further, positioned adjacent the operator is a climate control module 183 that allows the operator to control the heater, air conditioner and fan. In one form of the present invention the cooling system has a 25,500 BTU output and the heating system has a 41,200 BTU output. Other heating and cooling capacities are contemplated herein.

The operator from his vantage point in seat 184 can move (FIG. 6) the steering console to a variety of positions in order to make the operation of the vehicle more comfortable. In the preferred embodiment, the steering console is a tilt steering console, having a range of movement between 15–45°. Further, the dash module 190 is connected to the steering console and the steering console and dash module 190 are designed and constructed to move together as a unit. Other types of movable steering consoles are contemplated herein, such as a telescopic steering console. In the preferred embodiment, the dash module 190 moves freely under the control of the operator relative to the cab 30.

Figure 11:
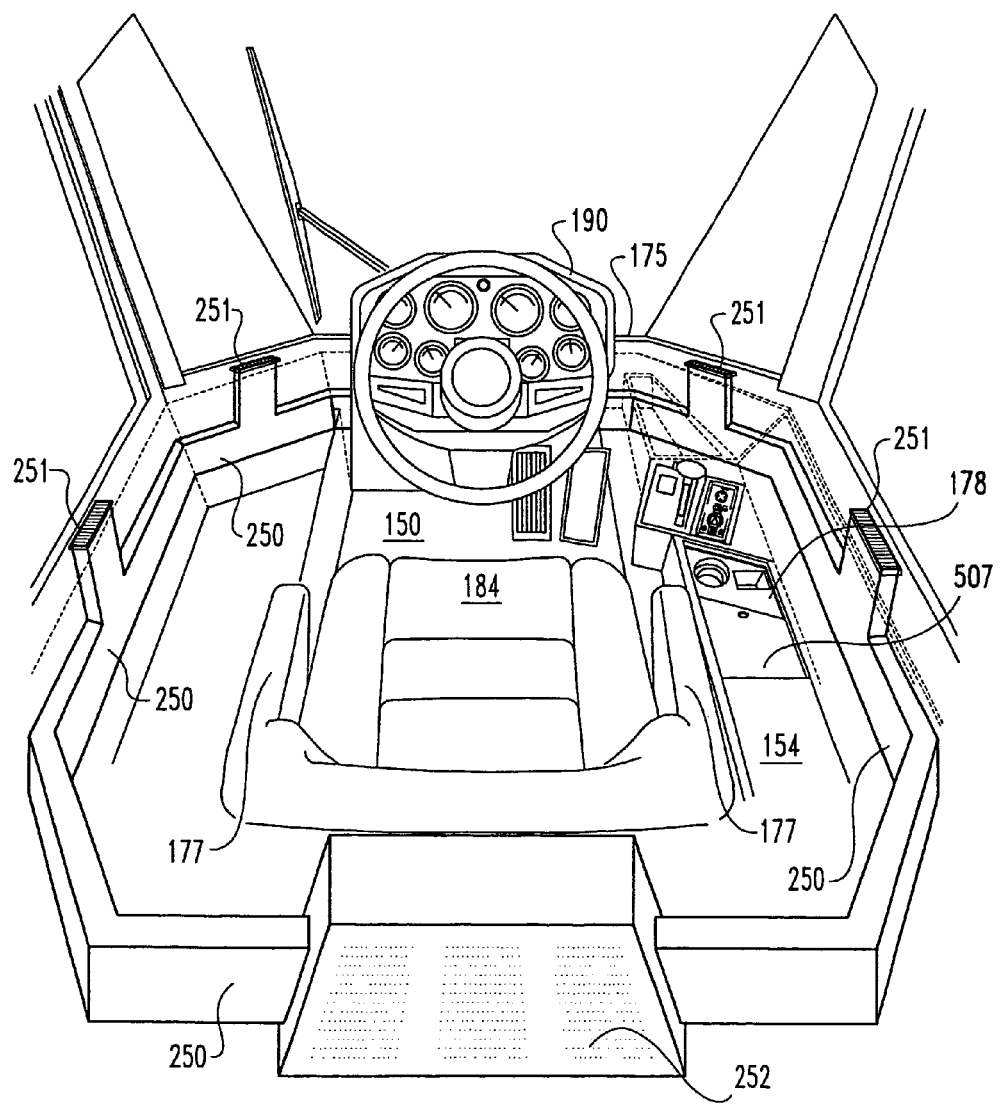
FIG. 11 is a perspective view of the interior of the operator cab with structure removed to illustrate the duct work comprising a portion of the FIG. 1 front discharge transit mixer apparatus.

Referring to FIG. 11, there is illustrated a perspective view of the interior of the operating cab 30, with the interior trim and sheet metal skin removed to illustrate the internal duct utilized for the heating, air conditioning and ventilation system is located. The interior duct work 250 has been built into the body of the cab 30 to provide a passageway for the movement of air to the operator environment and to the respective discharge outlets 251 positioned adjacent each window in the cab. Further, an additional discharge outlet provides for the discharge of air to the operators leg and foot areas. A high-volume air conditioner and heating unit 252 is positioned behind the operator's seat 184. The unit 252 being connected to the duct work 250 for transmission of air to the registers/discharge outlets 251. The incorporation of the climate control system into the operator cab 30 not only enhances the operator's comfort level, but also allows for the prevention or minimization of condensation and fog on the exterior windows.

Figure 12:
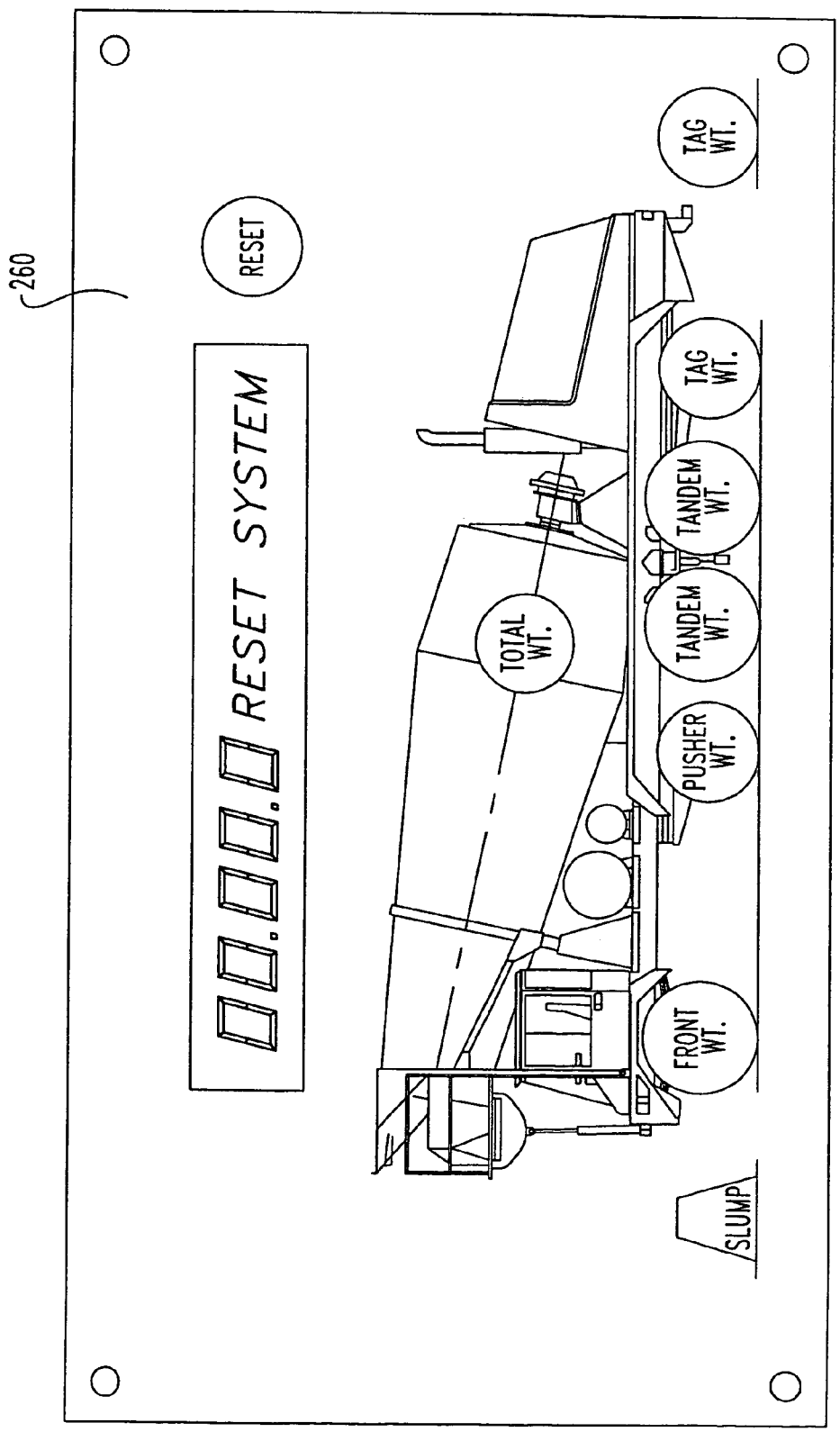
FIG. 12 is an illustrative view of the input and output module for the integrated weight system comprising a portion of the FIG. 1 front discharge transit mixer apparatus.

With reference to FIG. 12, there is illustrated an interactive control module 260 for a transit mixer apparatus weight system. The transit mixer interactive control module 260 has been configured such that by the pressing of a switch will enable the operator to determine parameters associated with the weight of the the concrete and the load on the respective axles of the vehicle.

More particularly, the specific parameters include a first interactive point for the front weight which gives the driver the tare weight of the front axle only plus an accumulative total of any additional weight that may be added to the front axle as the truck is loaded. A pair of second interactive points gives the driver the tandem weight which translates to the tare weight of the rear axles only plus an accumulative total of any additional weight that may be added to the rear axle as the truck is loaded. In one form of the present invention the weight for each tandem axle is provided separately, in an alternative form of the present invention the interactive control module combines the weight of the tandem axles for reporting to the operator. Total weight gives the vehicles total tare weight plus an accumulative total of any additional weight that may be added to the vehicle as the truck is loaded. By pushing the pusher and tag interactive points the driver obtains the total weight on each of the auxiliary axles. Pushing the slump interactive point gives the driver a readout of the slump of the concrete to the nearest one half inch plus the operating pressure of the transit mixers hydraulic system. Further, the operator has the capability to push an interactive point to obtain the total gallons of water that has been added to this particular load of concrete. Furthermore, an additional interactive point gives the driver a read out of both the weight and total cubic yards of payload carried in the mixing barrel.

Figure 13:
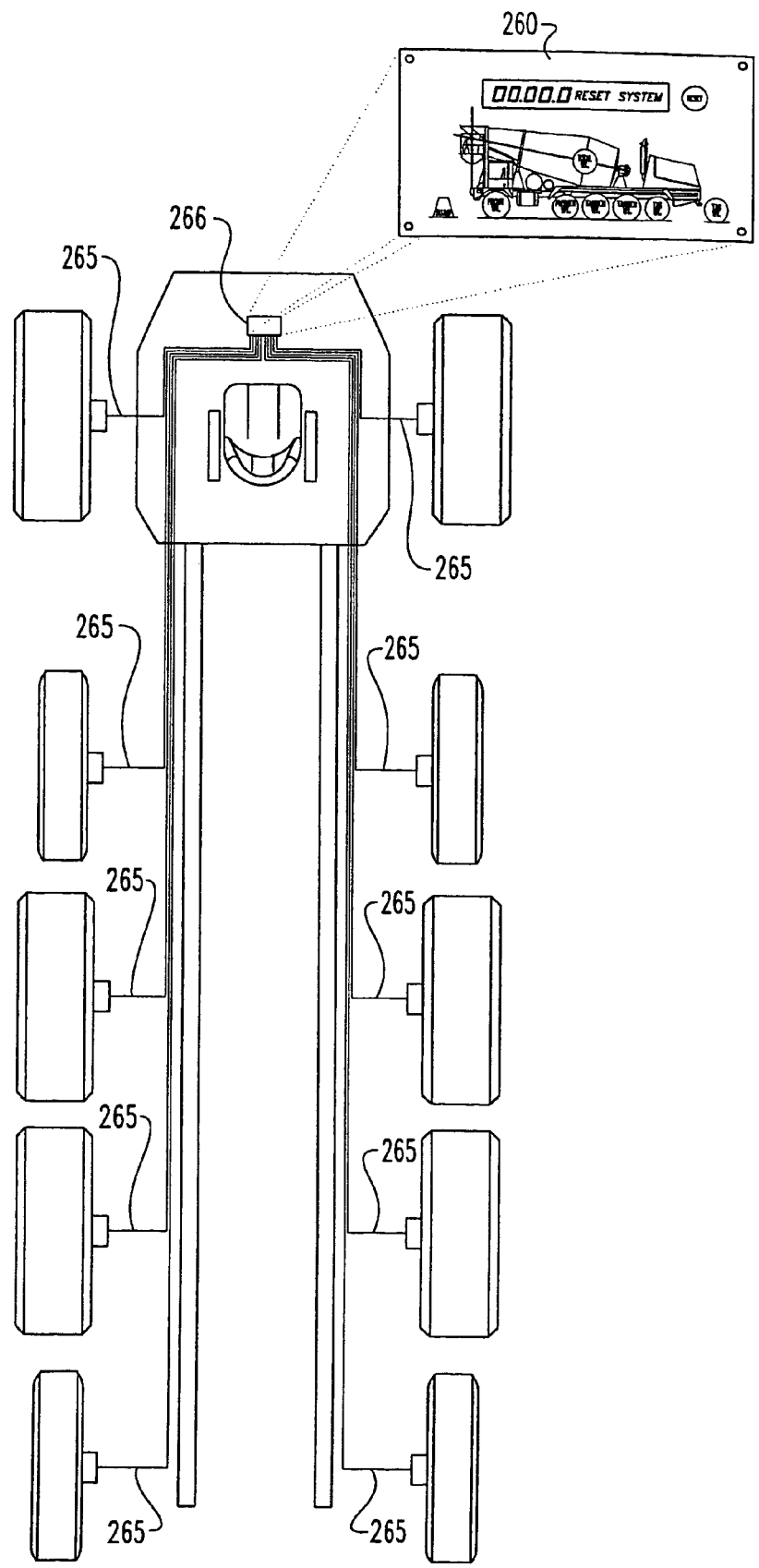
FIG. 13 is a diagrammatic illustration of the weight system comprising a portion of the FIG. 1 front discharge transit mixer apparatus.

With reference to FIG. 13, there is illustrated a schematic of the load sensing portion of the total weight system for the front discharge transmit mixer apparatus 10. Associated with each wheel is a pressure transducer 265 for sensing and communicating the air pressure in the air springs associated with each wheel. The pressure data from each wheel is fed via a communication pathway to a central processor 266 locator within the operator cab 30, and the data is interpreted by the central processor 266 so that the operator can interact with the processor 266 through control module 260. The analyzed data provided from the interactive control module 260 will enable the operator to determine the load at each axle, and adjust the air pressure accordingly in the air springs so as to distribute the load and comply with government highway and bridge loading regulations. The capability of being able to monitor the load on each axle will assist the operator in adjusting the axle loading so as to comply with government regulations associated with road and bridge loading.

Figure 14:
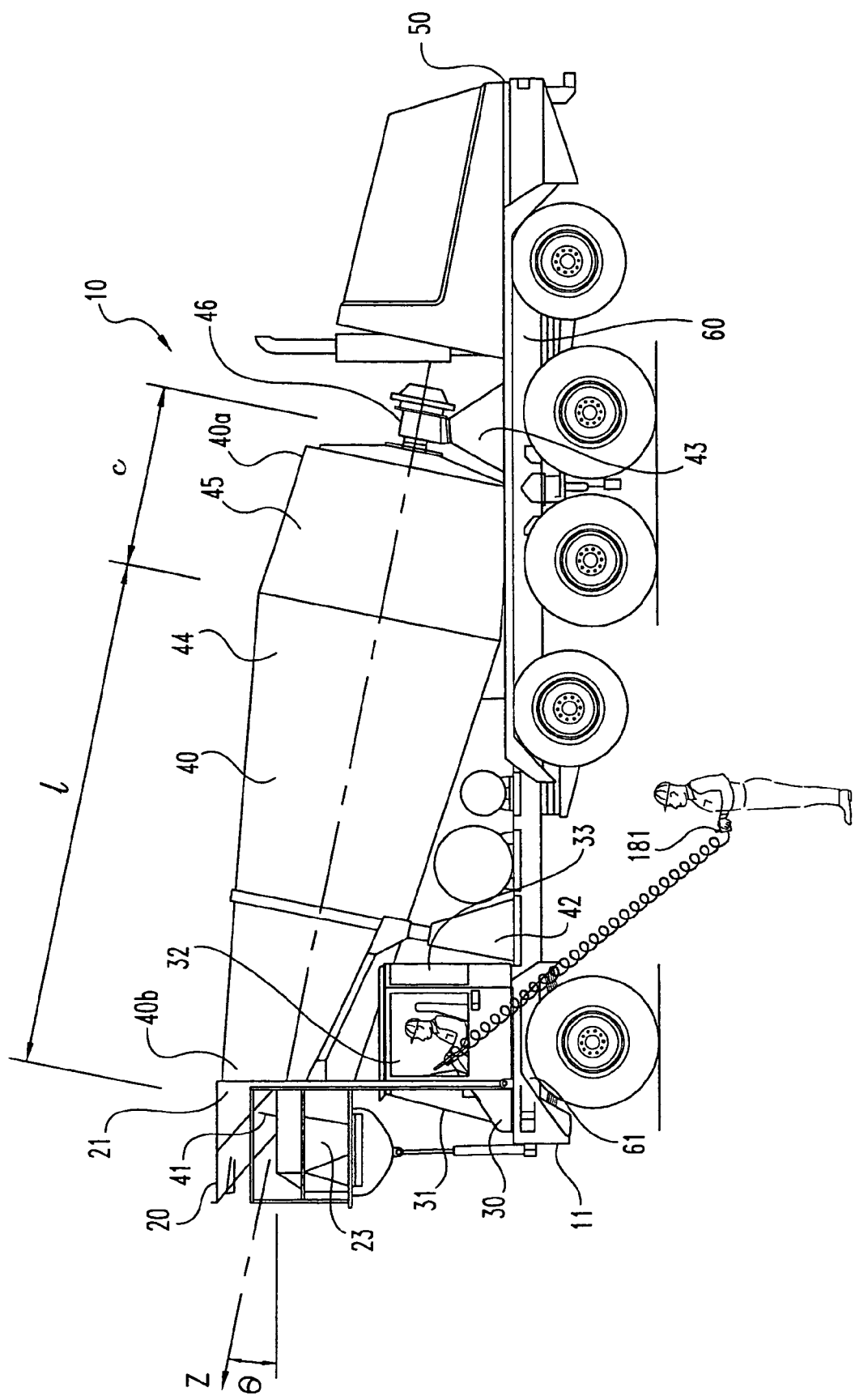
FIG. 14 is a side elevational view of an the FIG. 1 front discharge transit mixer with a mixer control unit being operated remotely from the cab.

With reference to FIG. 14, there is illustrated a side elevational view of the transit mixer apparatus 10 as previously set forth in FIG. 1 having the mixing apparatus control unit 181 operated at a location remote from the operator cab. In one form of the present invention the mixing apparatus control unit 181 is coupled to the apparatus 10 by a flexible cord. Other systems for remote communication are contemplated herein including radio transmission. Further, in another embodiment of the present invention a second mixing apparatus control unit 181 is mounted to an exterior location on the transit mixer 10. The exteriorly mounted mixing apparatus unit 181 is positioned proximate the front end of the apparatus 10 to enable the operator to control the necessary functions of the chute and discharge/charge system.

Figure 15A:
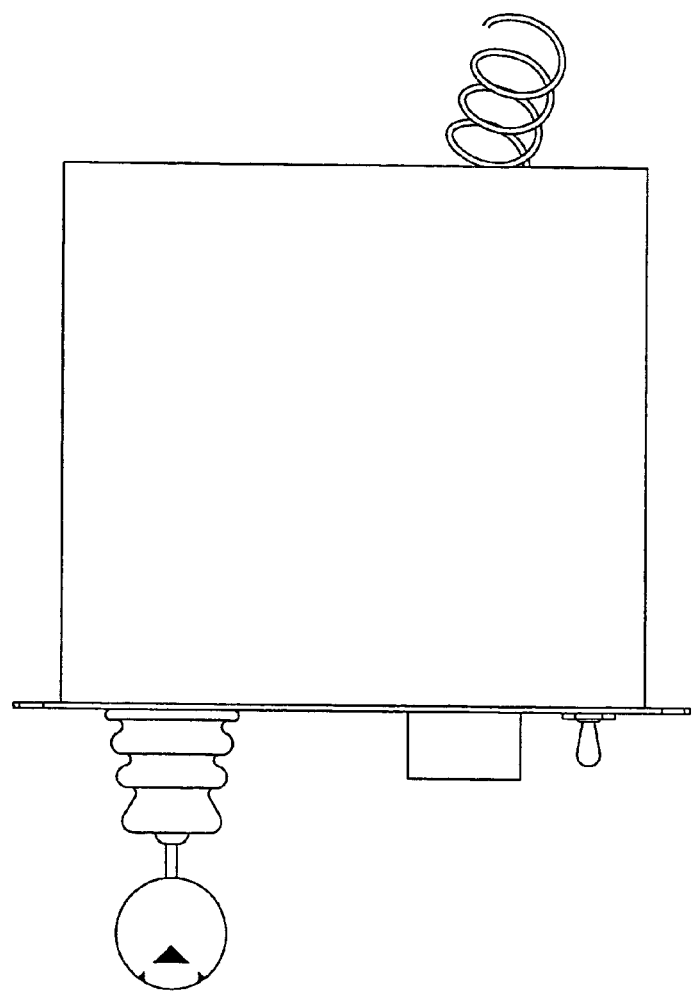
FIG. 15a is a side elevational view of the mixer control unit of FIG. 15.
Figure 15:
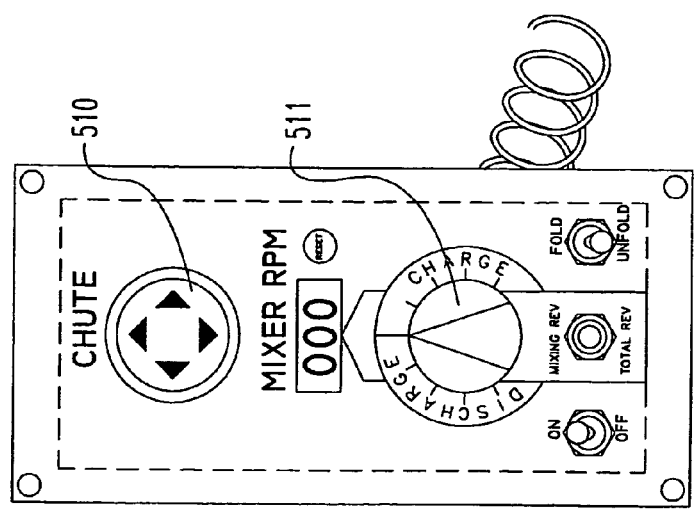
FIG. 15 is a plan view of the mixer control unit comprising a portion of the FIG. 14 transit mixer.

With reference to FIGS. 15 and 15*a*, there are illustrated enlarged views of the mixing apparatus control unit 181. The mixing apparatus control 181 integrates the chute control 510 and the discharge and charging control 511 of the barrel into one microprocessor controlled system. The chute control 510 is an electronic joy stick that is utilized to control the hydraulic cylinders for simultaneous movement of the front discharge chute inasimuth and elevation. The discharge and charge control 511 allows the operator to select a speed which will subsequently be maintained at a constant speed independently of the engine speed. In another form of the present invention the microprocessor has preprogrammed speeds that are selected by the operator for charging and/or discharging. The ability to maintain a constant speed independent of the engine speed results in a reduction in barrel wear, and enables the charging of the barrel at an optimized flow rate without overflowing. Further, the electronic control allows the driver to select to discharge concrete from the barrel at a pre-programmed speed in revolutions per minute. The mixing apparatus control unit 181 provides the operator with data related to the barrel revolutions. The data available to the operator includes mixing revolutions and the total revolutions of the mixing barrel.

Figure 16:
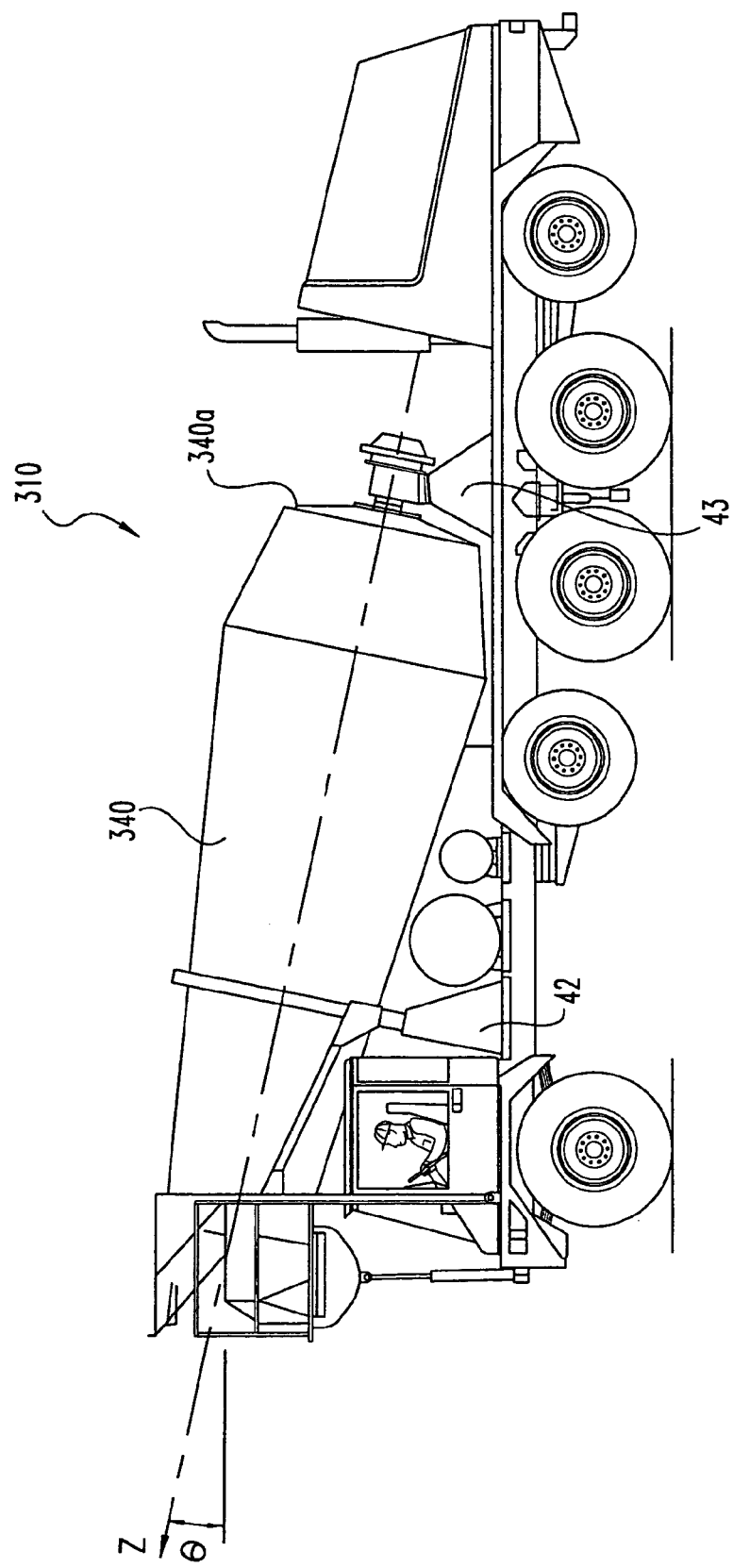
FIG. 16 is a side elevational view of an alternate embodiment of the front discharge transit mixer apparatus having a different size mixer barrel mounted thereon.

With reference to FIG. 16, there is illustrated a side elevational view of another embodiment of the transit mixer apparatus. Transit mixer apparatus 310 is substantially identical to the transit mixer apparatus 10 and hereinafter like figure numbers will represent like features in the FIG. 16 and FIG. 1. The mixing barrel 340 has been manufactured to a different length than mixing barrel 40, with the difference in length being designed to change the weight distribution loading on the chassis. The front support 42 for barrel 340 has not changed, and the rear mount 43 is identical with the exception that is has been moved to a new location on mounting rails 311 (FIG. 5). In this example the rear mount 43 has been slid forward on rails 311 to move the back end 340*a* of mixing drum 340 forward. The shifting of the rear mount 43 is accomplished by sliding the rear mount 43 on the mounting rails 311 and locking the rear mount 43 in the new location. In the preferred embodiment, the locking of the rear mount 43 to the mounting rails 311 is accomplished by moving fasteners into a different aperture in the rails 311. The changing of the position of the rear mount 43 will cause a change to the weight distribution of the plurality of axles.

With reference to FIGS. 1–16, an example of the distribution of concrete to multiple locations will be set forth. The operator has the capability through the interactive control module to obtain the weight of the apparatus 10 and any concrete associated therewith. From this reference point the operator can discharge a quantity of concrete at a first job site, and then utilize the interactive control module 260 to calculate the new weight of the apparatus 10. The difference in weight translates to a volume of concrete that was delivered to the first job site. Proceeding to the second job site the operator can continue to discharge concrete at each location, and have an accurate record of the quantity of concrete delivered. From this information the proprietor of the concrete delivery service/batch plant can invoice the respective customers. Further, an onboard printer is utilized in one embodiment to print billing tickets or invoices for the customer at the job.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method of changing the weight distribution loading on the chassis of a first transit mixer relative to the weight distribution loading on the chassis of a second transit mixer, said method comprising:

providing a first front discharge transit mixer apparatus comprising a first transit mixer chassis, a first rear mixing drum mount, and a first mixing drum; and providing a second front discharge transit mixer apparatus comprising a second transit mixer chassis, a second rear mixing drum mount, and a second mixing drum; wherein said second transit mixer chassis is substantially identical to said first transit mixer chassis; and moving the position of the second rear mixing drum mount on the second transit mixer chassis relative to the position of the first rear mixing drum mount on the first transit mixer chassis; wherein said movement is effective for changing the weight distribution loading on the chassis of said first transit mixer relative to the weight distribution loading on the chassis of said second transit mixer.

2. A method according to claim 1 wherein said second mixing drum has a length that differs from the length of said first mixing drum.

3. A method according to claim 1 wherein said moving step comprises mounting said second rear mixing drum mount to mounting rails attached to said second chassis.

4. A method of changing the weight distribution of a second front discharge transit mixer apparatus relative to the weight distribution of a first front discharge transit mixer apparatus, wherein said first front discharge transit mixer apparatus includes a first front mount and a first rear mount and wherein said second front discharge transit mixer apparatus includes a second front mount and a second rear mount, said method comprising: mounting a first front discharge mixing barrel on a first front discharge mixer chassis, and mounting a second front discharge mixing barrel on a second front discharge mixer chassis; wherein said second mixing barrel has a length that differs from the length of said first mixing barrel, with the difference in length being effective to change the weight distribution loading on the chassis of said second transit mixer relative to the weight distribution loading on the chassis of said first transit mixer;

and wherein said method further includes the step of moving the position of said second rear mount on the second front discharge mixer chassis relative to the position of said first rear mount on the first front discharge mixer chassis.

* * * * *